United States Patent
Uchiyama et al.

(10) Patent No.: US 9,588,266 B2
(45) Date of Patent: Mar. 7, 2017

(54) OPTICAL FILTER AND OPTICAL APPARATUS

(75) Inventors: Masayuki Uchiyama, Saitama (JP); Michio Yanagi, Saitama (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 249 days.

(21) Appl. No.: 14/118,002

(22) PCT Filed: May 17, 2012

(86) PCT No.: PCT/JP2012/062700
§ 371 (c)(1),
(2), (4) Date: Nov. 15, 2013

(87) PCT Pub. No.: WO2012/157719
PCT Pub. Date: Nov. 22, 2012

(65) Prior Publication Data
US 2014/0071552 A1 Mar. 13, 2014

(30) Foreign Application Priority Data

May 17, 2011 (JP) ................. 2011-110595
Jun. 9, 2011 (JP) ................. 2011-128757

(51) Int. Cl.
*G02B 1/10* (2015.01)
*G02B 5/22* (2006.01)
(Continued)

(52) U.S. Cl.
CPC ............... *G02B 5/22* (2013.01); *G02B 1/115* (2013.01); *G02B 1/118* (2013.01); *G02B 5/205* (2013.01); *G02B 3/0087* (2013.01)

(58) Field of Classification Search
CPC . G02B 5/22; G02B 1/11; G02B 5/285; G02B 5/223; G02B 1/115; G02B 5/28;
(Continued)

(56) References Cited

U.S. PATENT DOCUMENTS 5,283,692 A 2/1994 Herbst
5,715,103 A 2/1998 Amano et al.
(Continued)

FOREIGN PATENT DOCUMENTS

CN 1102885 A 5/1995
CN 1584635 A 2/2005
(Continued)

OTHER PUBLICATIONS

Oct. 28, 2014 Japanese Official Action in Japanese Patent Appln. No. 2013-515200 and partial translation thereof.
(Continued)

*Primary Examiner* — Jade R Chwasz
(74) *Attorney, Agent, or Firm* — Fitzpatrick, Cella, Harper & Scinto

(57) ABSTRACT

There is provided an optical filter of the type having absorption and with low reflection, which includes a light-transmitting substrate; and a light-absorbing gradient refractive index thin film provided on the substrate and whose refractive index changes so as to be close to the refractive index of the substrate toward the substrate side in a film thickness direction. There is also provided an optical apparatus using the optical filter.

15 Claims, 14 Drawing Sheets

(51) Int. Cl.
*G02B 1/115* (2015.01)
*G02B 5/20* (2006.01)
*G02B 1/118* (2015.01)
*G02B 3/00* (2006.01)

(58) Field of Classification Search
CPC .......... G02B 5/205; G02B 5/20; G02B 5/286; G02B 1/105; G02B 5/206; G02B 1/118; G02B 3/0087
USPC ....... 359/885, 888, 580, 581, 582, 586, 588, 359/589, 590
See application file for complete search history.

(56) References Cited

U.S. PATENT DOCUMENTS

| | | | |
|---|---|---|---|
| 7,193,780 B2 | 3/2007 | Wada et al. | |
| 7,265,905 B2 | 9/2007 | Wada et al. | |
| 7,271,959 B2 | 9/2007 | Wada et al. | |
| 7,274,512 B2 | 9/2007 | Wada et al. | |
| 7,277,228 B2 | 10/2007 | Wada et al. | |
| 7,289,268 B2 | 10/2007 | Wada et al. | |
| 7,312,925 B2 | 12/2007 | Wada et al. | |
| 7,324,283 B2 | 1/2008 | Wada et al. | |
| 7,369,314 B2 | 5/2008 | Wada et al. | |
| 2004/0027700 A1* | 2/2004 | Yoshida | C03C 17/007 359/883 |
| 2005/0041293 A1 | 2/2005 | Wada et al. | |
| 2007/0053062 A1* | 3/2007 | Sasaki | G02B 1/111 359/582 |
| 2007/0095958 A1 | 5/2007 | Wada et al. | |
| 2007/0103784 A1 | 5/2007 | Wada et al. | |
| 2007/0103785 A1 | 5/2007 | Wada et al. | |
| 2007/0109645 A1 | 5/2007 | Wada et al. | |
| 2007/0109646 A1 | 5/2007 | Wada et al. | |
| 2007/0109647 A1 | 5/2007 | Wada et al. | |
| 2007/0109648 A1 | 5/2007 | Wada et al. | |
| 2007/0263287 A1 | 11/2007 | Wada et al. | |
| 2014/0085729 A1 | 3/2014 | Uchiyama et al. | |

FOREIGN PATENT DOCUMENTS

| | | |
|---|---|---|
| CN | 1924617 A | 3/2007 |
| CN | 101241199 A | 8/2008 |
| EP | 1 693 689 A1 | 8/2006 |
| JP | 63-071801 A | 4/1988 |
| JP | 07-063915 A | 3/1995 |
| JP | 08-075902 A | 3/1996 |
| JP | 08-083581 A | 3/1996 |
| JP | 2002-267815 A | 9/2002 |
| JP | 2004-212462 A | 7/2004 |
| JP | 2005-133131 A | 5/2005 |
| JP | 2009-122216 A | 6/2009 |
| JP | 2010-277094 A | 12/2010 |
| WO | 2010/150615 A1 | 12/2010 |

OTHER PUBLICATIONS

Jun. 19, 2012 International Search Report in International Patent Appln. No. PCT/JP2012/062700.
Apr. 30, 2015 Chinese Official Action in Chinese Patent Appln. No. 201280035495.0.
Oct. 1, 2014 Extended European Search Report in European Patent Appln. No. 12785144.2.
Nov. 30, 2015 Chinese Official Action in Chinese Patent Appln. No. 201280035495.0.

* cited by examiner (a)                      (b)

(a)        (b)

(a)

(b)

(a)

(b)

OPTICAL FILTER AND OPTICAL APPARATUS

TECHNICAL FIELD

The present invention relates to an optical filter having a light-absorbing gradient refractive index thin film provided on a light-transmitting substrate and an optical apparatus having an imaging optical system including the optical filter.

BACKGROUND ART

Many optical filters for use in various applications have problems caused by reflection of the filters themselves. For example, in some cases, an optical filter for use in an imaging optical system involves a phenomenon that part of light transmitted through the filter is reflected by another member and re-enters the optical filter from a light emitting surface of the optical filter. In such a case, if the optical filter has a reflectance in a wavelength region of the incident light, the light reflected by another member and re-entered is reflected again by the optical filter. As a result, a problem caused by the light reflected by the optical filter occurs. Therefore, further enhancement of the anti-reflection function of the optical filter has been strongly desired.

A light-absorbing-type optical filter including an absorbent structure, whose surface reflectance is made close to zero as far as possible, can also provide desired transmission characteristics by adjusting light-absorbing characteristics.

In general, as such an optical filter of the type having absorption in a desired wavelength region, an absorption-type ND (Neutral Density) filter for use in a light diaphragm device is widely known.

The light diaphragm is provided in an optical device to control the amount of light incident on a solid-state imaging element such as a silver halide film, or CCD and CMOS sensors. Some light diaphragms are structured so as to be narrowed to be smaller as the object field becomes brighter. When an object is photographed in the field of high brightness or in good weather, such structured light diaphragm enters a so-called small aperture state, which is susceptible to influence such as a diaphragm hunting phenomenon and a light diffraction phenomenon, which may cause deterioration in image performance.

As a countermeasure to this, it is devised that an ND filter is arranged near the aperture along an optical path through the diaphragm or an ND filter is directly attached to a diaphragm blade. The amount of light can be controlled in such an ND filter arrangement to increase the diaphragm aperture even if the object field has the same brightness.

With recent advances in sensitivity of the imaging element, improvements have been made to further reduce light transmittance by increasing the density of ND filters. As a result, the diaphragm aperture can be prevented from becoming too small, even if an imaging element with high sensitivity is used.

A transparent substrate made of glass or plastic material is used for the substrate for making the ND filter. Regarding the demands for machinability into any shape, reduction in size and weight in recent years, various plastic materials have come to be widely used as the substrate. Examples of the plastic materials for the substrate can include PET (polyethylene terephthalate), PEN (polyethylene naphthalate), PC (polycarbonate), PO (polyolefin). Regarding them, in particular, a norbornene-based resin and a polyimide-based resin as represented by Arton (product name, fabricated by JSR Co., Ltd.), Zeonex (product name, fabricated by Nippon Zeon Co., Ltd.) have been preferably used, from a comprehensive point of view including heat resistance and flexibility as well as a cost-related point of view.

Examples of the light absorption-type ND filter include a type, which is obtained by kneading of a mixture of a light-absorbing organic dye or pigment to incorporate dye or pigment to a substrate; and a type, which is obtained by applying a light-absorbing organic dye or pigment to a substrate. There is a case that these types may have a fatal drawback that the spectral transmittance has large wavelength dependence. Therefore, the ND filter has been made by forming a multi-layer film on a transparent substrate made of plastic or glass by a vacuum film forming method such as a deposition method and a sputtering method, as the current most common method of fabricating an ND filter.

Even in the ND filter as such an optical filter, with respect to further high sensitivity, high resolution of the recent solid-state imaging element, there is an increasing possibility that a captured image has a problem such as ghost and flare caused by reflection of the filter itself as described above. One of the big challenges for use in a camera under a strong light source has been performed to reduce the spectral reflectance in a visible wavelength region more than ever before.

The following methods have been known for reflection reduction. First, JP 08-075902A (Patent Literature 1) proposes a method of suppressing the reflectance of any wavelength region, for example, by laminating several types of thin films each having the different refractive indexes and being made of different materials such as $SiO_2$, $MgF_2$, $Nb_2O_5$, $TiO_2$, $Ta_2O_5$, and $ZrO_2$ to form a multi-layer film-type anti-reflection film. In addition, JP 2009-122216A (Patent Literature 2) discloses an ND filter using a fine periodic structure as an anti-reflection structure. Further, JP 2010-277094A (Patent Literature 3) proposes a method of improving transmission flatness as an example to obtain the desired spectral reflectance characteristics in a light-absorbing film.

REFERENCE LIST

Patent Literature

Patent Literature 1: JP08-075902A
Patent Literature 2: JP2009-122216A

SUMMARY OF INVENTION

Technical Problems to be Solved by the Invention

However, in a case of an anti-reflection film using a multi-layer film as disclosed in Patent Literature 1, in order to significantly reduce the reflectance over a wide wavelength region, only limited materials can be used as the thin film materials for making the multi-layer film. Therefore, such a structure requires a substantial number of layers or complicates the design.

When the anti-reflection structure of the ND filter has a fine periodic structure formed at a sub-micron pitch as disclosed in Patent Literature 2, it is relatively easier to expand the anti-reflection wavelength region and further easier to reduce the reflectance than the multi-layer film structure disclosed in Patent Literature 1. However, the structure to provide the fine periodic structure on the substrate disclosed in Patent Literature 2 may cause a problem with light reflection at an interface thereof. In addition, for example, even in a light-absorbing layer made of a multi-layer thin film, it is extremely difficult to reduce the reflection of the overall ND filter close to zero as far as, by offsetting all light reflection occurring between structures of the ND filter only by interference effects.

Patent Literature 3 proposes a method of increasing transmittance flatness using absorbent materials with small dispersion characteristics in a desired wavelength region. It is relatively easy to obtain desired transmission characteristics by increasing only the transmittance flatness. However, there is a problem that, in order not only to reduce the reflectance to, for example, about 0.5% and but also to significantly increase flatness while maintaining a predetermined concentration, a very large number of layers or an extremely thin layer are required or its design becomes very complicated.

It is an object of the present invention to provide an optical filter that reduces problems caused by reflectance of a light-absorbing optical filter as described above. It is another object of the present invention to provide an optical filter that can not only reduce problems caused by reflectance thereof, but also increase transmittance flatness. In addition, ghost caused by the reflectance can be reduced by using such an optical filter with reduced reflection in an imaging optical system. It is still another object of the present invention to provide an optical apparatus that can achieve high precision such as high-quality image using an optical filter with reduced reflection and increased transmittance flatness in an imaging optical system.

Means for Solving the Problems

An optical filter according to the present invention comprises a light-transmitting substrate; and a light-absorbing gradient refractive index thin film, whose refractive index changes so as to be close to the refractive index of the substrate toward the substrate side in a film thickness direction thereof.

The optical apparatus according to the present invention includes an imaging optical system provided with the optical filter as described above.

Effects of Invention

The present invention can provide an absorption-type optical filter with reduced reflection. The use of the optical filter in the imaging optical system can remarkably reduce problems such as ghost caused by reflection of the filter. The use of the filter with increased flatness of the spectral transmission characteristics can also remarkably improve, for example, color balance caused by spectral transmission. In addition, an imaging apparatus using such an optical filter particularly in a light diaphragm device can achieve a device for providing high-quality image.

DESCRIPTION OF EMBODIMENTS

Figure 1:
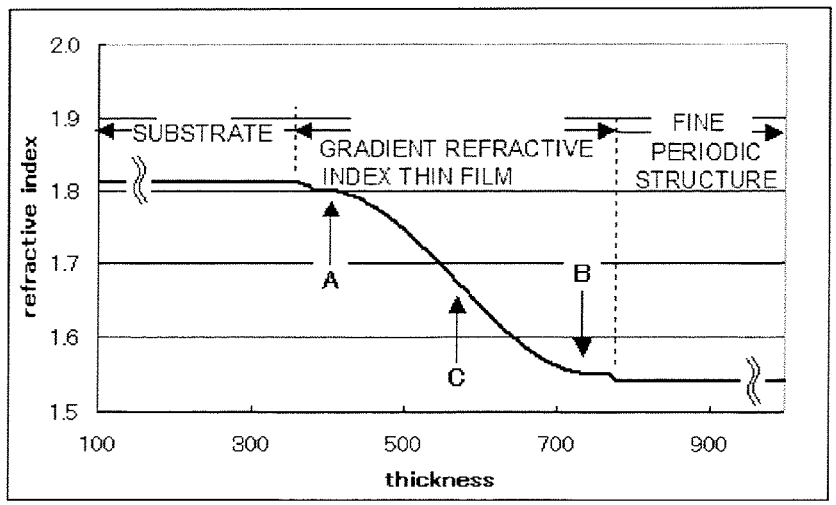
FIG. 1 illustrates an example of a refractive index distribution of a gradient refractive index thin film according to the present invention.

The optical filter according to the present invention includes a light-transmitting substrate, a light-absorbing gradient refractive index thin film, and preferably an anti-reflection structure.

The substrate used for the invention has strength and optical characteristics as the substrate of the optical filter, and can function as a base for forming the gradient refractive index thin film and the anti-reflection structure. The substrate can be made of a glass-based material or a resin material selected from PET (polyethylene terephthalate), PEN (polyethylene naphthalate), PES (polyether sulfone), PC (polycarbonate), PO (polyolefin), PI (polyimide), PMMA (polymethyl methacrylate).

The gradient refractive index thin film has refractive index changes continuously or stepwise in a film thickness direction thereof so as to be close to the refractive index of the substrate. This structure can reduce the refractive index difference between the substrate and the air or the other structure (for example, the anti-reflection structure) adjacent to the gradient refractive index thin film.

When the refractive index change in the film thickness direction is divided into a plurality of regions in the film thickness direction, the gradient refractive index thin film has a region where the spectral transmission characteristics of the visible wavelength region increase as approaching a long wavelength side and a region where the spectral transmission characteristics of the visible wavelength region decrease as approaching the long wavelength side. The refractive index of the gradient refractive index thin film preferably continuously changes in the film thickness direction. The continuous change can exert an effect of increasing an anti-reflection effect and environmental stability. In addition, when the structure adjacent to the gradient refractive index thin film is the anti-reflection structure, the gradient refractive index thin film reduces the refractive index difference between the substrate and the anti-reflection structure. The refractive index can be set so that the difference between the refractive index of the end portion on the substrate side of the gradient refractive index thin film and the refractive index of the end portion on the anti-reflection structure side of the gradient refractive index thin film is less than the refractive index difference between the substrate and the anti-reflection structure. It is particularly preferable to change the refractive index so as to continuously connect the refractive index of the substrate and the refractive index of the anti-reflection structure. Alternatively, the reflectance of both surfaces of the substrate may be reduced by providing at least either one of the anti-reflection structure and the gradient refractive index thin film on a surface on an opposite side of the gradient refractive index thin film provided on one side of the substrate.

The gradient refractive index thin film is a light-absorbing thin film and is placed on the substrate in a thickness direction thereof. The anti-reflection structure is preferably provided on the gradient refractive index thin film. The light-absorbing property of the gradient refractive index thin film is set according to the functions and characteristics of the intended optical filter. If at least about 1% of incident light is absorbed with respect to a predetermined wavelength of the incident light, the film can be said to have a light-absorbing property with respect to the wavelength.

The gradient refractive index thin film has a refractive index change comprising a continuous and periodical change in a thickness direction thereof. The refractive index change of the gradient refractive index thin film in the optical filter comprising the substrate, the gradient refractive index thin film, and the anti-reflection structure preferably includes the following portions:

(1) a portion where, on the substrate side, the refractive index changes so as to be close to the refractive index of the substrate until the end point on the substrate side of the refractive index change; and
(2) a portion where, on the anti-reflection structure side, the refractive index changes so as to be close to the refractive index of the anti-reflection structure until the end point on the anti-reflection structure side of the refractive index change.

The above end point on the substrate side of the refractive index change is indicated, for example, by point "A" in FIG. 1, and the above end point on the anti-reflection fine periodic structure side is indicated by point "B". In the example illustrated in FIG. 1, the refractive index of the gradient refractive index thin film changes so as to be close to the refractive index of the substrate, in a terminal portion including end point (or start point) "A" on the substrate side of the refractive index distribution change. Likewise, in a terminal portion including end point (or start point) B on the anti-reflection structure side of the refractive index distribution change, the refractive index of the gradient refractive index thin film also changes so as to be close to the refractive index of the anti-reflection structure. Point A may be positioned on an interface on the substrate side. Point B may be also positioned on an interface on the anti-reflection structure side. If the change is continuous or the refractive index difference is small, the reflectance can be greatly reduced. Therefore, the refractive index can come close to the refractive index of an adjacent structure such as the substrate or the fine periodic structure, with smooth refractive index change from a larger refractive index thereof or from a smaller refractive index thereof. Sum (a+b) of difference "a" between the refractive index of the end portion on the substrate side in the film thickness direction of the gradient refractive index thin film and the refractive index of the substrate, and difference "b" between the refractive index of the end portion on the fine periodic structure side in the film thickness direction of the gradient refractive index thin film and the refractive index of the fine periodic structure may be smaller than the refractive index difference between these two structures adjacent to both surfaces of the gradient refractive index thin film.

In other words, the refractive index of the gradient refractive index thin film changes in the film thickness direction so as to reduce the difference between the refractive index of the substrate and the refractive index of the material of the fine structure, which satisfies the relation $|A-B|>a+b$, where $|A-B|$ denotes a refractive index difference between refractive index "A" of the substrate and refractive index "B" of the fine periodic structure with respect to (a+b). This relation is applied to the substrates, the other gradient refractive index thin films, and the anti-reflection structures in FIGS. 2 and 16 as described later.

Depending on the film forming method, an initial portion of the thin film formed on the substrate may have a portion with a constant refractive index in the thickness direction. For example, as described later, when the gradient refractive index thin film is formed on the substrate, the mixing ratio of a plurality of thin film forming-materials is changed to form a continuous change of the refractive index in the film thickness direction. At this time, after a certain time has elapsed since the film formation started with a certain film forming-material concentration, the mixing ratio of the plurality of thin film forming-materials can be changed. In this case, a portion can be formed, without a change in refractive index in the thickness direction as described above.

The refractive index at the end point of the refractive index change on the substrate side is equal to the refractive index of the substrate or may be a refractive index in a range of the refractive index difference allowed according to the characteristics of the intended optical filter with respect to the refractive index of the substrate. Likewise the refractive index at the end point of the refractive index change on the anti-reflection structure side is equal to the refractive index of the anti-reflection structure or may be a refractive index in a range of the refractive index difference allowed according to the characteristics of the intended optical filter in a wavelength of the transmitted light or a wavelength region thereof with respect to the refractive index of the anti-reflection structure. These refractive index differences are preferably 0.05 or less. Thus, when a portion without a change in refractive index in the thickness direction as described above contacts an interface on the substrate side, the refractive index of the portion without a refractive index change preferably has a refractive index difference within 0.05 with respect to the refractive index of the substrate. This is also applied to the case where there is a portion without a change in refractive index in the thickness direction contacting an interface on the anti-reflection structure side.

The width of change in the refractive index in the thickness direction of the gradient refractive index thin film can be variously set depending on the characteristics of the intended optical filter, the type of material for forming the gradient refractive index thin film, and a combination thereof. For example, when the refractive index is changed from a region made of $SiO_2$ to a region made of $TiO_2$ using three kinds of elements in the thickness direction of the gradient refractive index thin film, the refractive index can be changed within a range of about 1.47 to 2.70.

The film thickness of the gradient refractive index thin film can be appropriately selected according to the intended function. The film thickness of the gradient refractive index thin film can be 10 to 4000 nm, and more preferably 100 to 1000 nm.

The anti-reflection structure may have an anti-reflection function required to obtain the optical characteristics of a desired optical filter.

The anti-reflection structure can be formed of a fine structure, or an anti-reflection thin film in a form of a single layer or a plurality of layers.

The fine structure can be a fine structure having a surface where a large number of fine projections are arranged at a pitch shorter than the wavelength of visible light or a fine structure having a surface where repeated recesses and projections are provided at a pitch shorter than the wavelength of visible light. These fine structures includes a structure that reduces the refractive index difference between the structure and the air or the adjacent medium by means of randomly formed projections such as needle-like bodies and columnar bodies, and projected portions or recessed portions of a projection-recess structure finely formed in a staircase shape. These fine structures can be a fine structure selected from well-known fine structures according to the purpose. For example, the fine structure can be fabricated with good reproducibility using an optical nanoimprint method as long as the structure is a periodic structure made of a large number of projections arranged at a repetition period shorter than the wavelength of visible light transmitting the substrate or a fine periodic structure having a periodic structure made of a recess-projection structure at a repetition period shorter than the wavelength of visible light transmitting the substrate.

In a case of an anti-reflection film of a single layer or a plurality of layers, the gradient refractive index thin film changes in refractive index in the film thickness direction so as to reduce the refractive index difference between the refractive index of a layer adjacent to the gradient refractive index thin film and the refractive index of the substrate.

The optical reflectance in the optical filter can be remarkably reduced by adjacently arranging the substrate, the gradient refractive index thin film where the refractive index continuously changes in the film thickness direction, and the anti-reflection structure exhibiting anti-reflection effects in a desired optical wavelength region, in this order respectively. It is required for high image quality, such as color balance in the optical filter having a light-absorbing gradient refractive index thin film to adjust and increase the spectral transmission characteristics. For such requirement, the refractive index relation among the substrate, the gradient refractive index thin film, and the anti-reflection structure is set as described above in (1) and (2) using a thin film with the refractive index changing stepwise or continuously in the film thickness direction, preferably continuously and periodically. This preferred structure can provide an absorption-type optical filter with remarkably reduced reflection and increased flatness of the spectral transmission characteristics.

The optical filter structure according to the present invention can be applied to various optical filters such as ND filters and optical filters as long as the optical filter is absorption-type and has a problem with reflection.

Hereinafter, the optical filter according to the present invention will be described based on embodiments using an ND filter.

(First Embodiment)

Figure 2:
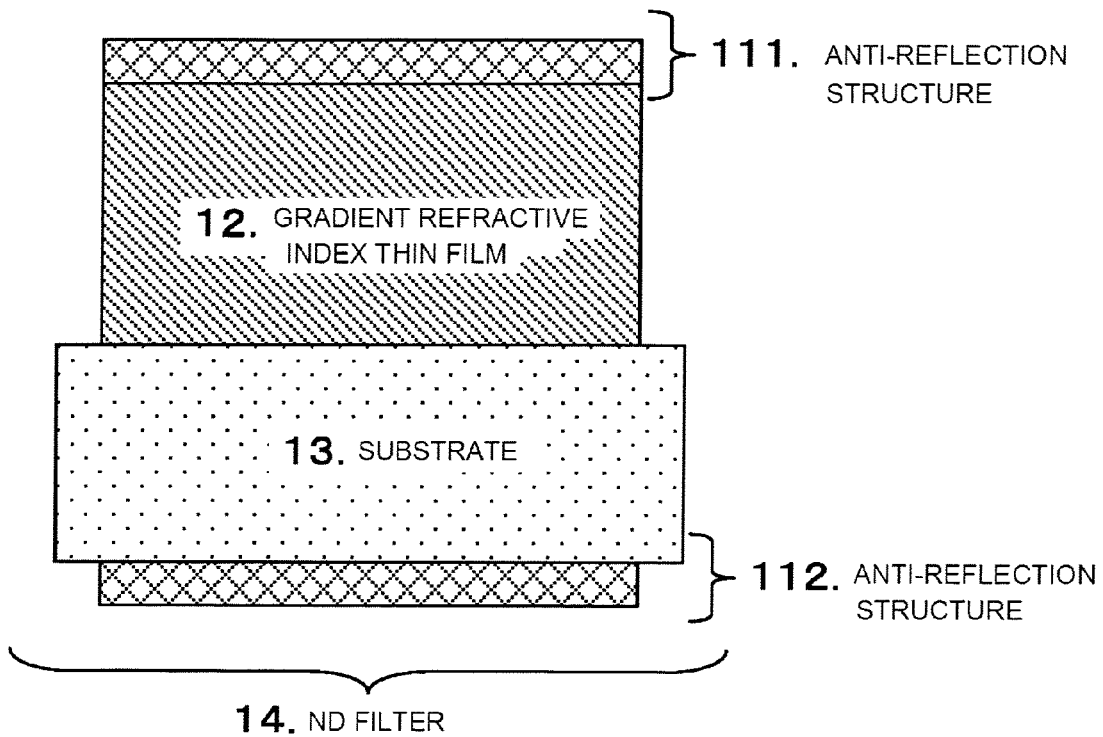
FIG. 2 illustrates a structural example of an optical filter according to the present invention.

An absorption-type ND filter formed as illustrated in FIG. 2 will be described in detail as follows.

The refractive index for use in the embodiments and each example in the following description is identified as a refractive index of light with a wavelength of 540 nm from the materials of the substrate, the gradient refractive index thin film, and the anti-reflection structure.

As illustrated in FIG. 2, a gradient refractive index thin film 12 was arranged on one surface (upper surface) side of a substrate 13. When an anti-reflection structure 111 is arranged on the gradient refractive index thin film 12 and an anti-reflection structure 112 is arranged on a lower surface of the substrate 13, further anti-reflection effects can be obtained. In addition, at least an inner part of the gradient refractive index thin film 12 has absorption.

In a case of the structure as illustrated in FIG. 2, the reflection on the lower surface of the substrate will increase, and thus the lower surface may often require some kind of anti-reflection structure 112. As illustrated in FIGS. 3(a) to (b), examples of such anti-reflection structures 111 and 112 include fine periodic structures 151 and 152 having anti-reflection effects and anti-reflection films 161 and 162 formed of a thin film of a single layer or a plurality of layers. Further, as illustrated in FIGS. 3(c) to (d), the examples thereof include a structure of using a combination of the fine periodic structure 15 and the anti-reflection film 16. Any optimal structures may be appropriately selected. Such a structure can suppress occurrence of ghost light due to filter reflection, for example, no matter which surface of the filter is oriented to the imaging element side, and thus the filter can be arranged in the optical system regardless of the direction of the filter.

Figure 3:
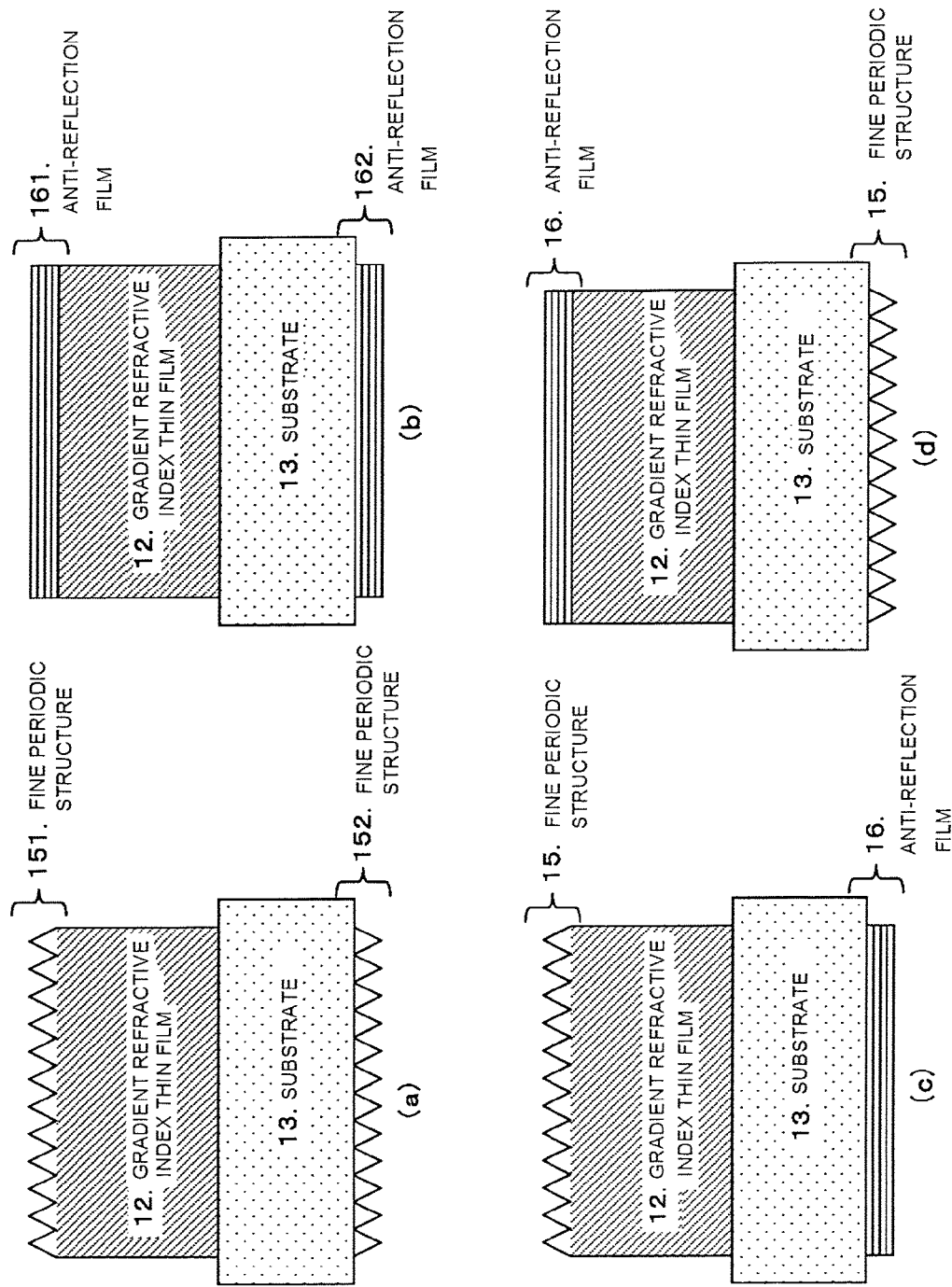
FIG. 3 illustrates examples of the variation of the structure of the optical filter according to the present invention.

Regarding FIGS. 3 (a) to (d), the structure as illustrated in FIG. 3(a) is more preferable from the point of view of reduction in reflection. Thus, in Example 3 according to the present invention to be described later, the fine periodic structures 151 and 152 were formed on each surface of the substrate 13 as the anti-reflection structure as illustrated in FIG. 3(a).

A function providing the same effect as that of the anti-reflection films 161 and 162, which is formed as a multi-layer film as illustrated in FIG. 3(b), can be incorporated, for example, into the gradient refractive index thin film 12. In this case, a refractive index profile is required for preventing reflection at an interface with the outside air by increasing and decreasing the refractive index a plurality of times in a periodic and continuous manner in a predetermined region near the interface of the surface layer. Thus, the structure can be considered to separately provide an anti-reflection structure on the gradient refractive index thin film. When the anti-reflection film is fabricated, materials different from the materials used to fabricate the gradient refractive index thin film can be used to fabricate the anti-reflection film on the gradient refractive index thin film so as to change the refractive index in a periodic and continuous manner.

<Regarding Gradient Refractive Index Thin Film>

The gradient refractive index thin film 12 was adjusted and fabricated by adjusting the film formation rate of $SiO_2$ and TiOx by meta-mode sputtering to combine these two materials, and continuously changing the refractive index in the film thickness direction so as to obtain desired absorbing characteristics.

Figure 4:
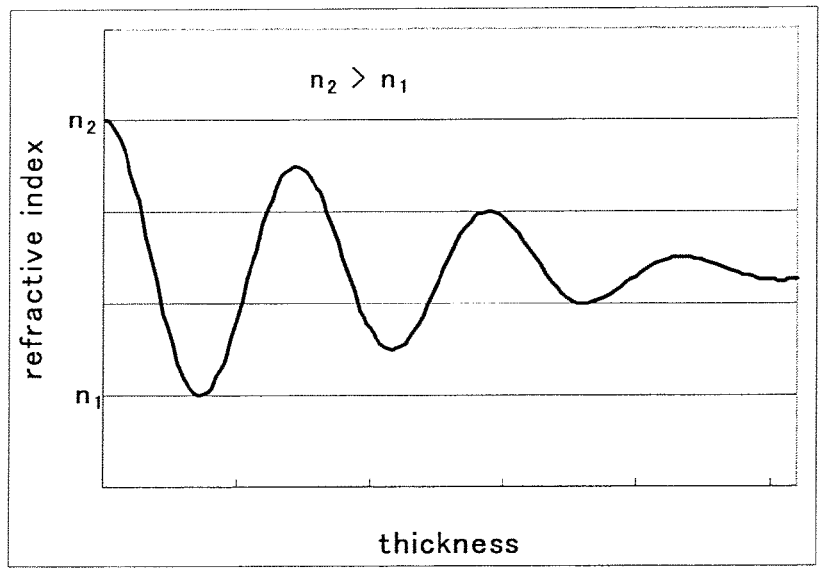
FIG. 4 illustrates an example of a refractive index profile of the gradient refractive index thin film according to the present invention.

Examples of the gradient refractive index thin film having such a continuous refractive index profile are illustrated in FIGS. 1 and 4. In FIG. 1, the substrate having a relatively high refractive index, the gradient refractive index thin film, and the fine periodic structure are laminated in this order. The refractive index changes so as to continuously increase or decrease the refractive index from the substrate side in the film thickness direction, and to be close to the refractive index of each adjacent structure as approaching an interface of both ends of the gradient refractive index thin film.

Various methods have been studied for designing such a gradient refractive index thin film. It has been found that even a step-type refractive index distribution with the refractive index changing stepwise and gradually, which is different from the continuous change, can obtain substantially the same optical characteristics as the film having continuously changing index by adjusting the refractive index distribution. However, for reduction in reflection, continuous refractive index change can provide more ideal characteristics, which can further eliminate an interface in the thin film, and the front and rear film compositions are very close to each other, thus exhibiting increase in film adhesion strength and improvement in environmental stability. From this point of view, it is better to select the refractive index distribution where the refractive index continuously changes.

An example of a refractive index profile of such a gradient refractive index thin film is illustrated in FIG. 1. FIG. 1 illustrates an example where the substrate having a relatively high refractive index, the gradient refractive index thin film, and the anti-reflection structure like the fine periodic structure are laminated in this order. The refractive index changes so as to continuously increase or decrease the refractive index from the substrate side in the film thickness direction, and to be close to the refractive index of each adjacent structure as approaching an interface of both ends of the gradient refractive index thin film. In the structure illustrated in FIG. 1, as the structural parts, the substrate is arranged on the left side and the anti-reflection structure is arranged on the right side in FIG. 1. In a case where the anti-reflection structure is not formed, the refractive index is changed so as to be close to an adjacent medium such as the air, water, and organic media. Regarding the above structure, the refractive index change is preferably gradual near the adjacent medium. The gradual refractive index change allows the front and rear compositions in the film thickness direction to be close to each other, thus further increasing environmental stability. If the environment is such that oxygen can be easily supplied near the adjacent medium, the environment can further reduce the effects of temporal changes. Thus, near points "A" and "B" in FIG. 1, the refractive index change per film thickness is more gradual, in other words smaller than the refractive index change of portion "C" having the largest refractive index change per film thickness, where the refractive index change continuously changes the refractive index between "A" and "B". Portion "C" having the largest refractive index change per film thickness can be appropriately designed between "A" and "B" considering the absorbing characteristics.

Internal reflection in the gradient refractive index thin film can be reduced by reducing the refractive index difference per film thickness together with increase of the environmental stability.

Figure 5:
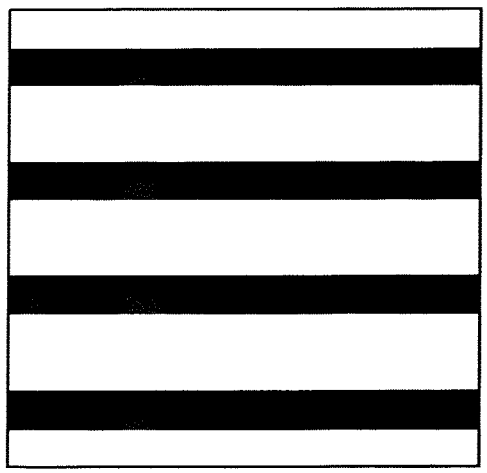
FIG. 5 illustrates electron micrographs of the multi-layer films and the gradient refractive index thin film.
Figure 5:
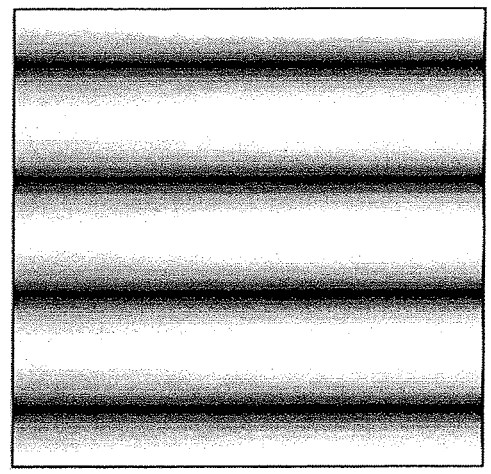

The gradient refractive index thin film is a thin film where the refractive index changes continuously, preferably continuously and periodically, in a direction perpendicular to the film surface, namely, in the film thickness direction. The film having the continuous and periodical refractive index changes in the film thickness direction can be called a rugate film, or a rugate filter. FIG. 5 illustrates a schematic view of electron micrographs of the multi-layer film and the gradient refractive index thin film. FIG. 5(a) is a schematic cross-sectional view in the film thickness direction of the multi-layer film, and FIG. 5(b) is a schematic cross-sectional view in the film thickness direction of the gradient refractive index thin film. For example, it is assumed that the dark-colored portions are $SiO_2$ portions and the light-colored (white) portions are $TiO_2$ portions, the multi-layer film is such that the film interface is clearly divided, while the gradient refractive index thin film is, unlike the multi-layer film, such that the film interface is not clearly divided. In addition, contrast is strong in the portions having a large refractive index change of the gradient refractive index thin film.

A plot of the results obtained by a depth direction analysis with density (strength) on the vertical axis and depth (parameter corresponding to the film thickness) on the horizontal axis is called a depth profile.

The depth direction analysis for studying composition distribution from the surface of a test sample to the inner side thereof often involves a method of analyzing by scraping the surface using accelerated ions for analysis in micron order or less. This method is referred to as ion sputtering, which is known as X-ray photoelectron spectroscopy (XPS) or Auger electron spectroscopy (AES or ESCA), and is often used to evaluate optical components, electronic components and functional materials having layered structures formed on the substrate surfaces.

These X-ray photoelectron spectroscopies emit X-rays to samples in ultra-high vacuum to detect electrons (photoelectrons) released. The released photoelectrons are caused by inner-shell electrons of atoms to be detected and the energy thereof is determined for each element. Thus, a qualitative analysis can be performed by knowing energy values. Thus, it is possible to confirm whether the desired refractive index distribution is obtained by evaluating the composition change in the film thickness direction of the gradient refractive index thin film to obtain a depth profile.

Various methods have been studied for designing such a gradient refractive index thin film. It has been found that even a step-type refractive index distribution with the refractive index changing stepwise and gradually, unlike the continuous change, can obtain substantially the same optical characteristics as the film having continuously changing index by adjusting the refractive index distribution. However, for reduction in reflection, continuous refractive index change can provide more ideal characteristics, which can further eliminate an interface in the thin film, and the front and rear film compositions are very close to each other, thus exhibiting the effects such as increase in film adhesion strength and improvement in environmental stability. From this point of view, it is better to select the refractive index distribution where the refractive index continuously changes.

Although the range of refractive index is limited, recent advancement in film formation technique such as sputtering and deposition allows any refractive index to be obtained within at least the range thereof.

For example, two kinds of materials can be simultaneously electrically discharged in sputtering. A refractive index intermediate material having an intermediate refractive index between those of two materials can be fabricated by changing an electric discharge power of each material, namely, an input power to the targets and changing the mixture ratio thereof. Two or more kinds of materials may be mixed.

In the case of such sputtering, when one of the materials is low power, the electric discharge may be unstable. In the case of meta-mode sputtering, problems such as a reaction mode occur. Thus, in order to achieve all refractive indexes between these two materials, it is necessary to control the film thickness in parallel by adjusting elements other than the input power, for example, by controlling the deposition amount by means of the mask method, which, however, greatly complicates the mechanism of the apparatus and the control thereof.

As noted above, in the meta-mode sputtering method, the refractive indexes were changed within a range in which the electric discharge can be stably maintained and controlled. It is possible not only to continuously change the refractive indexes in the film thickness direction but also to change "x" of TiOx in the film thickness direction and, further to change extinction coefficients as well. Thus, the structure according to the present embodiment can continuously change the refractive indexes and the extinction coefficients by continuously changing the composition ratio of the three kinds of elements: Ti, Si, and O in the film thickness direction of the gradient refractive index thin film. Even in cases where other materials are used and the number of kinds of materials to form the gradient refractive index thin film is increased, the same adjustment can be performed. The composition can be continuously changed by continuously changing the thin film density.

In addition, the absorbing characteristics in the gradient refractive index thin film 12 were adjusted not only by continuously changing the refractive indices in the film thickness direction but also by changing "x" of TiOx in the film thickness direction and changing the extinction coefficients as well. In Examples 2 to 4 to be described later, the spectral transmission characteristics in a visible wavelength region of 400 nm to 700 nm were set to be flat with small dispersion as the entire film.

Figure 6:
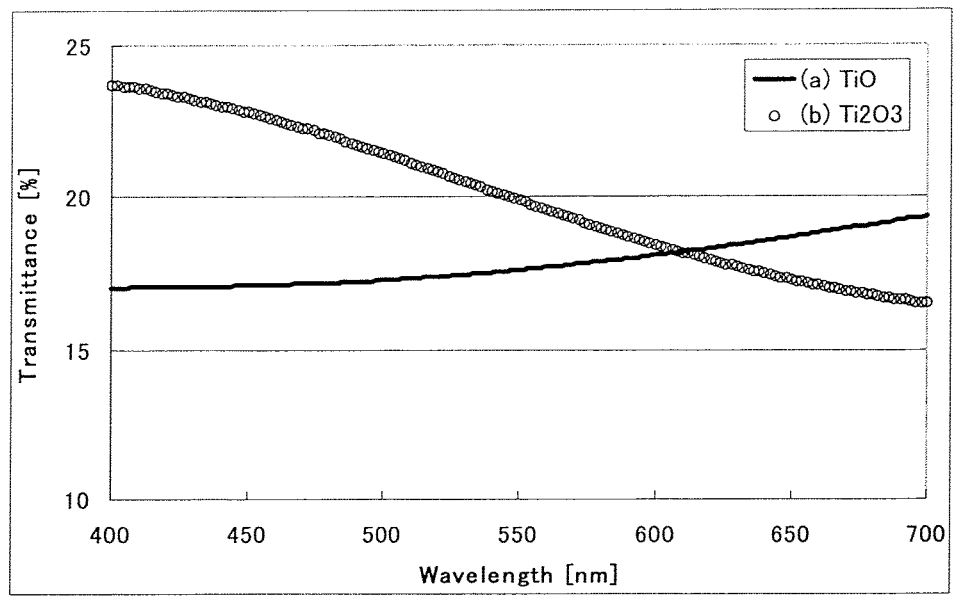
FIG. 6 illustrates an example of spectral transmittance characteristics of TiO and $Ti_2O_3$ according to the present invention.

As an example, in the case of TiO with "x" equivalent to 1, as illustrated by line (a) in FIG. 6, the spectral transmission characteristics in the visible wavelength region tend to gradually increase as approaching the long wavelength side. In the case of $Ti_2O_3$ with "x" equivalent to 1.5, as illustrated by line (b) in FIG. 6, the spectral transmission characteristics in the visible wavelength region tend to gradually decrease as approaching the long wavelength side. In light of this, as described above, the spectral transmission characteristics were adjusted to be flat as a whole by providing one or more combinations of arranging regions having an opposite dispersion shape in the film thickness direction of the gradient refractive index thin film 12. In the case of a metal oxide used in a conventional optical thin film, a similar tendency is observed, when the ratio of metal and oxygen changes. JP3359114B discloses an idea that a multi-layer film structure provides flat transmittance characteristics, because the wavelength dependence of the transmittance of two or more kinds of metal oxides having different extinction coefficients as transmittance-related coefficients is in relation to offsetting the change each other. The film design can be performed so as to improve flatness using such characteristics of the metal oxides. When the value of "x" is made variable, the refractive index is also changed. In light of this, it is necessary to determine the film formation ratio together with $SiO_2$ and to control the film formation based on the thus previously obtained basic data. The specific means of making the value of "x" variable in the film thickness direction can include controlling by adjusting the power of an oxidation source or adjusting the amount of gas to be introduced depending on the film forming method.

<Sputtering Apparatus Structure>

Figure 7:
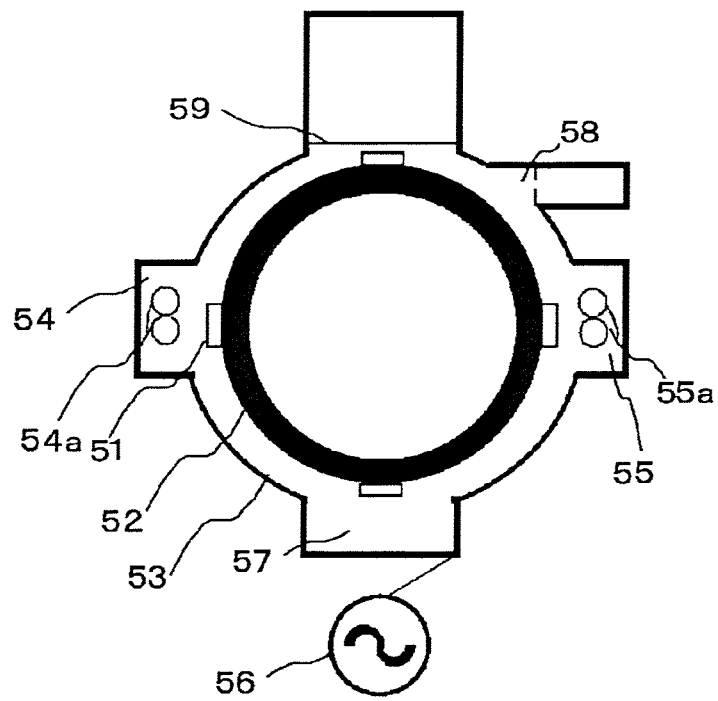
FIG. 7 is a schematic plan view of a sputtering apparatus for carrying out the present invention.

FIG. 7 is a cross-sectional plan view captured along the surface perpendicular to the rotating shaft of a substrate transfer apparatus of a sputter deposition apparatus used to fabricate the gradient refractive index thin film.

A sputter deposition apparatus comprises a rotatable cylindrical substrate transfer apparatus 52 holding a substrate 51 on which a thin film is to be formed, the substrate transfer apparatus 52 being provided inside a vacuum chamber 53; two sputter regions 54 and 55 provided in an annular space between an outer peripheral portion of the substrate transfer apparatus 52 and the vacuum chamber 53 outside thereof; and a reaction region 57. The substrate is loaded from a region 59.

The substrate 51 was placed on the substrate transfer apparatus 52 so that the surface on which a film was to be formed was oriented outside. The sputter regions 54 and 55 include AC double (dual) cathode-type targets 54a and 55a. A high-frequency power source 56 is arranged outside the vacuum chamber 53. The shape of a target material is not limited to be of a flat type, but may be of a cylindrical type. In addition to the above, for example, the region 58 may separately include an ion gun grid by high-frequency excitation having a grid electrode, or a neutralizer that releases low-energy electrons to neutralize positive ions to prevent the positive ion charge accumulation on the substrate. The sputtering apparatus for use in the present invention may include, for example, three or more sputter regions and may be implemented by any apparatus structures other than the above apparatus.

Using the sputtering apparatus illustrated in FIG. 7, the gradient refractive index thin film was formed in the form, in which a Si target was arranged in the sputter region 54; a Ti target was arranged in the sputter region 55; and oxygen was introduced in the reaction region 57. The substrate 51 fixed to the substrate transfer apparatus 52 was rotated at high speeds; Si and Ti ultra-thin films were formed on the substrate 51 in the sputter regions 54 and 55; and then the Si and Ti ultra-thin films were oxidized in the reaction region 57. Thus, the Si and Ti oxide films were formed. A mixed film of the Si oxide film and the Ti oxide film was fabricated by repeating the above process. Further, the gradient refractive index thin film having a continuous refractive index change in its film thickness direction was formed by continuously changing the sputter rate and the oxidation rate in each sputter region during film formation. A mixed film equivalent to $SiO_2$ and TiOx can also be fabricated by controlling the sputter rate and the oxidation rate of Si and Ti respectively based on film formation conditions independently for each of $SiO_2$ and TiOx. In a case in which the refractive index is continuously changed from the refractive index of the $SiO_2$ film alone to the refractive index of the TiOx film alone, when the input power is lowered, the electric discharge may be unstable. Thus, the input power was controlled and a masking system was used during oxidation rate control.

EXAMPLES

Example 1

An absorption-type ND filter formed as illustrated in FIG. 2 will be described in detail as follows. In the present example, the gradient refractive index thin film 12, at least a part of which has absorption in the thin film, was arranged on one side of the substrate 13. The structure having no anti-reflection structure was made.

SFL-6 glass with a thickness of 1.0 mm and a refractive index of 1.81 was used to fabricate the substrate 13 for forming such an ND filter 14. In particular, for a single-sided film structure of the present example, a glass material was used to minimize the influence of water absorption of the substrate.

The gradient refractive index thin film 12 was fabricated in such a manner that the two kinds of materials were mixed by adjusting the film formation rate of the $SiO_2$ and TiOx films by meta-mode sputtering. An adjustment was made such that the refractive index was continuously changed in the film thickness direction by continuously changing the composition in the film thickness direction so as to obtain desired absorbing characteristics. Further adjustment was made so that the film thickness of the gradient refractive index thin film 12 was 200 nm.

Figure 8:
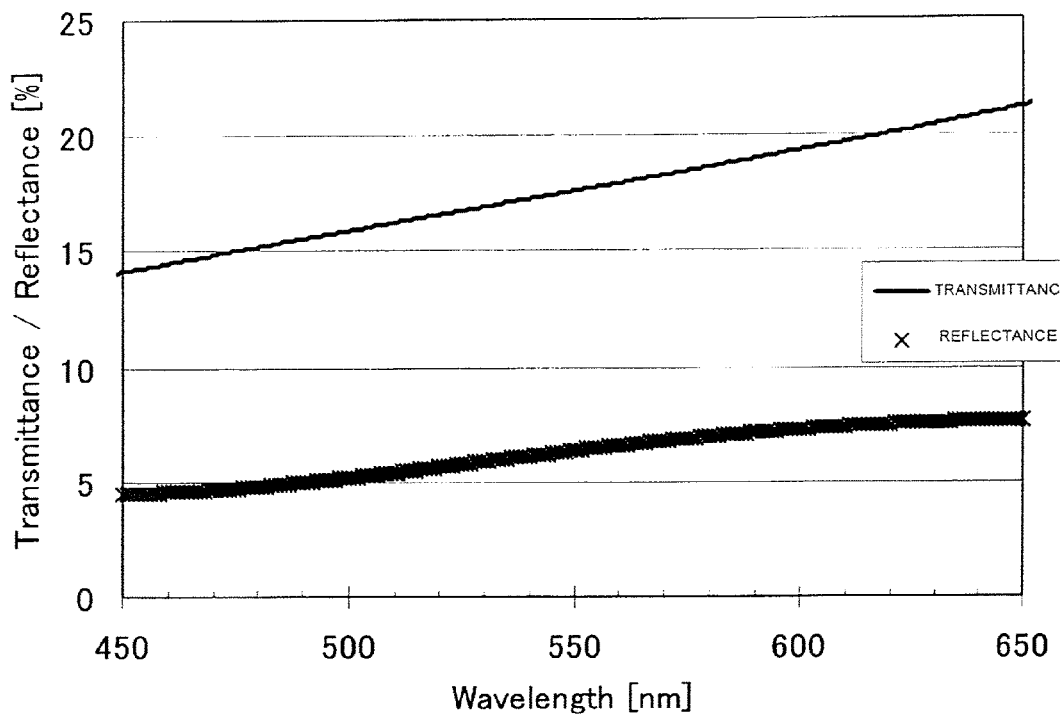
FIG. 8 illustrates spectral reflectance characteristics of the optical filter fabricated in Example 1.

In the present example, the refractive index change in the film thickness direction of the gradient refractive index thin film 12 was designed to be minimized as required so that increase or decrease not to be complicated. In order to obtain the absorption as illustrated in FIG. 8, a refractive index profile was set for one peak of ascending and descending of refractive indexes starting from a refractive index of the substrate 13. If a maximum value of a refractive index change per film thickness is set, a simple profile having an inflection point as a peak on the substrate 13 (high refractive index) side is easier to gradually change the refractive index with respect to media (including the substrate 13 as well) adjacent to the gradient refractive index thin film 12 in comparison with a complicated profile having a plurality of peaks and bottoms. The substrate 13 is made from glass and is higher in refractive index than air and the common plastics. Therefore, an inflection point was set such that, in order to obtain a predetermined absorption, a peak of ascending and descending of the refractive index was provided near the substrate 13 in the gradient refractive index thin film 12, i.e., closer to substrate 13 side than the center position in the film thickness direction of the gradient refractive index thin film. The structure was made such that the refractive index changed gradually from the peak illustrated by point C in FIG. 1, passing through a portion having a maximum change rate per film thickness in the film thickness direction within the gradient refractive index thin film, toward the air side. The end point of the gradient refractive index thin film 12 was formed as a $SiO_2$ thin film, from the point of view of anti-reflection and environmental stability. Thus, the refractive index at the end point of the gradient refractive index thin film 12 was about 1.47.

The spectral transmittance characteristics of the ND filter fabricated as described above are illustrated in FIG. 8. The filter was subjected to a high temperature test under a dry nitrogen atmosphere, and the transmittance at a wavelength of 540 nm after 1000 hours were elapsed was compared before and after the test. The transmittance increased from 17.2% to 17.4% with an increase rate of about 1 percent.

In order to clarify the effects of the present structure, Ti was used in the present example because Ti is understood to be relatively easily oxidized. However, the other materials such as Nb and Ni, whose oxidization are relatively difficult, can be also used to make the transmittance change smaller.

In addition, in the present example, a single-density ND filter was fabricated. If a gradation ND filter is to be fabricated, a mask having a shielding plate capable of adjusting its angle to a mask surface is used. Then, the ND filter can be formed using a method of film-forming with a gradation density distribution on the substrate by partially shielding the target surface of the film material by the mask.

Comparative Example 1

In order to consider the effects of the environmental stability in Example 1, the spectral transmittance characteristics substantially the same as those in FIG. 8 were fabricated using a multi-layer film structure with a film thickness of 200 nm. There follows a description of an ND filter 4 fabricated such that the other materials and processes were the same as those in Example 1 as much as possible.

Figure 9:
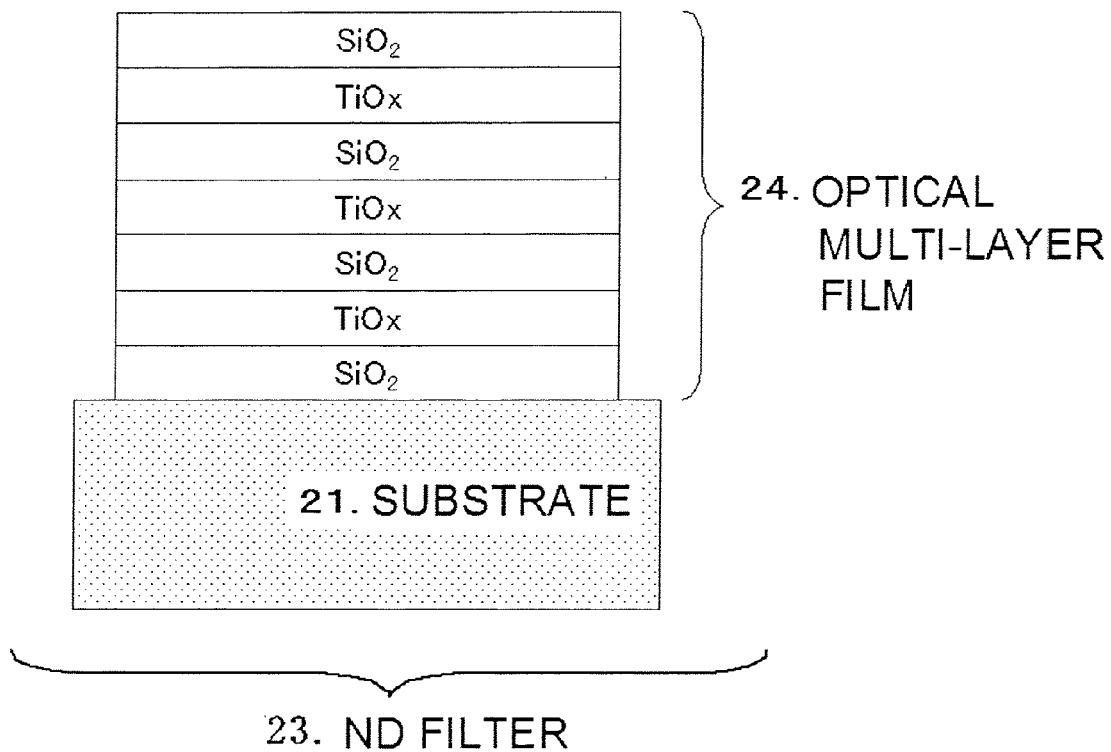
FIG. 9 illustrates a structural example of an optical filter as Comparative Example 1.
Figure 10:
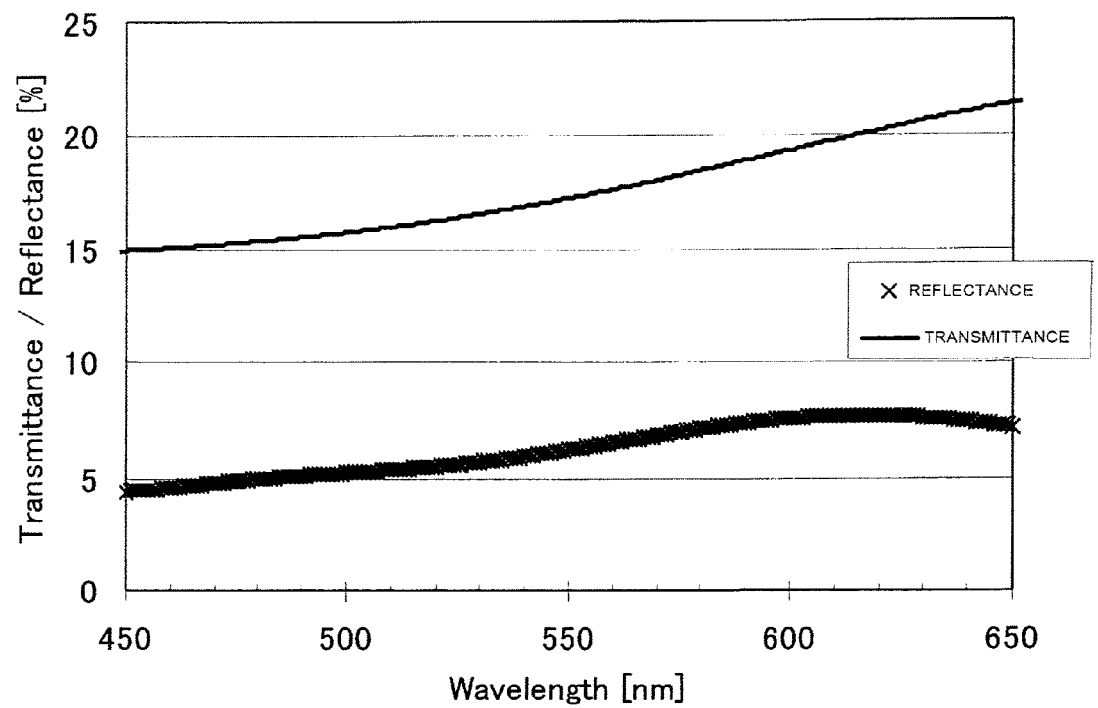
FIG. 10 illustrates spectral reflectance characteristics of an ND filter fabricated in Comparative Example 1.

In the same manner as in Example 1, as illustrated in FIG. 9, an optical multi-layer film 2 alternately laminating $SiO_2$ and TiOx to form seven layers was formed on one side of a substrate 3. The film design was such that as illustrated in FIG. 10, an ND filter 4 having substantially the same spectral transmittance characteristics as those of the ND filter 14 fabricated in Example 1 was fabricated. SFL-6 glass with a refractive index of 1.81 and a thickness of 1.0 mm was used to fabricate the substrate 3 for forming such an ND filter 4. $SiO_2$ and TiOx were formed by meta-mode sputtering.

Thus fabricated ND filter was subjected to a high temperature test under a dry nitrogen atmosphere, and the increase rate of transmittance at a wavelength of 540 nm after 1000 hours were elapsed was confirmed to find that the transmittance increased from 16.9% to 17.6% before and after the test with a change of about 4 percent. Particularly when compared with the ND filter fabricated in Example 1, the results showed a very large change.

Example 2

In the same manner as in Example 1, a substrate 13 was made from SFL-6 glass with a thickness of 1.0 mm and an ND filter including the substrate 13 and a gradient refractive index thin film 12 was fabricated. The gradient refractive index thin film 12 was adjusted and fabricated such that while adjusting the film formation rate of $SiO_2$ and TiOx films by meta-mode sputtering so as to have a film thickness of 200 nm, the two kinds of materials were mixed and the composition thereof was continuously changed, thereby continuously changing the refractive index in the film thickness direction so as to obtain desired absorbing characteristics. In addition to this, by changing x of TiOx, the structure was made such that a region where the spectral transmittance in the visible wavelength region increases as approaching a long wavelength side and a region where the spectral transmittance in the visible wavelength region decreases as approaching the long wavelength side were provided in the gradient refractive index thin film 12. Thus, regarding the spectral transmittance in a specific wavelength region, by providing regions having an opposite dispersion shape in the same film, for example, the ND filter can obtain more flat spectral transmission characteristics with smaller wavelength dispersion.

In the present example, in the same manner as in Example 1, a design was made to be minimum required increase or decrease not to complicate the refractive index profile of the gradient refractive index thin film 12. A refractive index profile was set to have one peak of ascending and descending of refractive indices starting from a refractive index of the substrate 13. In an interface with the gradient refractive index thin film 12 and the substrate 13, the composition ratio of a mixed film equivalent to $SiO_2$ and TiO was adjusted to be a refractive index of 1.81 close to that of the substrate 13. Then, as going away from the substrate 13 in the film thickness direction, the composition ratio equivalent to TiO with respect to $SiO_2$ was gradually increased until the refractive index reached 2.1, and then changes were made from continuous changes in composition ratio of the two kinds of materials to changes in acid value of TiO until continuously reaching $Ti_2O_3$ equivalent. Then, when the composition became a mixed film equivalent to $SiO_2$ and $Ti_2O_3$, by gradually increasing the composition ratio equivalent to $SiO_2$ with respect to $Ti_2O_3$, changes were made from changes in acid value to continuous changes in composition ratio of the two kinds of materials and at an end point of the gradient refractive index thin film 12, a structure was made to be $SiO_2$ from the point of view of anti-reflection and environmental stability. Thus, the refractive index at the end point of the gradient refractive index thin film 12 was about 1.47.

By doing so, a region exhibiting a spectral transmission strongly affected by TiO and a region exhibiting a spectral transmission strongly affected by $Ti_2O_3$ were configured in the gradient refractive index thin film. As a result, regions having different dispersion characteristics as illustrated in FIG. 6 were mixed in the visible wavelength region, thereby enabling desired transmission characteristics to be obtained. In the present example, the spectral transmission characteristics were adjusted in the visible wavelength region so as to be more flat than those in Example 1.

Figure 11:
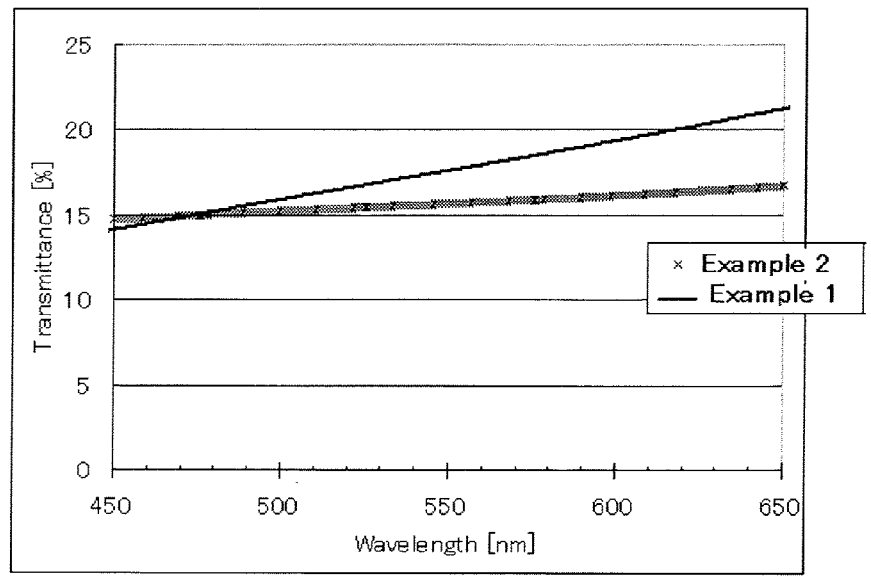
FIG. 11 illustrates a comparative diagram of the spectral transmission characteristics between Example 1 and Example 2.

The spectral transmittance characteristics of the ND filter fabricated as described above were illustrated in FIG. 11. From FIG. 11, when compared with the ND filter fabricated in Example 1, it can be confirmed that the flatness of the spectral transmittance in the visible wavelength region was improved.

This was subjected to a high temperature test under a dry nitrogen atmosphere, and the transmittance at a wavelength of 540 nm after 1000 hours were elapsed was compared before and after the test. The transmittance increased from 15.7% to 15.9% with an increase rate of about 1 percent.

Example 3

<Regarding Anti-Reflection Structure>

The gradient refractive index thin film 12 was formed on the substrate 13, and then the fine periodic structures 151 and 152 as sub-micron pitch anti-reflection structures having anti-reflection effects were formed on the gradient refractive index thin film 12 by optical nanoimprint method using a UV curable resin.

With recent advancement in microfabrication technique, fine periodic structures have been fabricated.

The fine periodic structure having an anti-reflection effect as one of such structures can generally be called a Moth-Eye structure. The structure was shaped such that the refractive indices were continuously changed in a pseudo manner, thereby reducing reflection due to a refractive index difference between materials.

Figure 12:
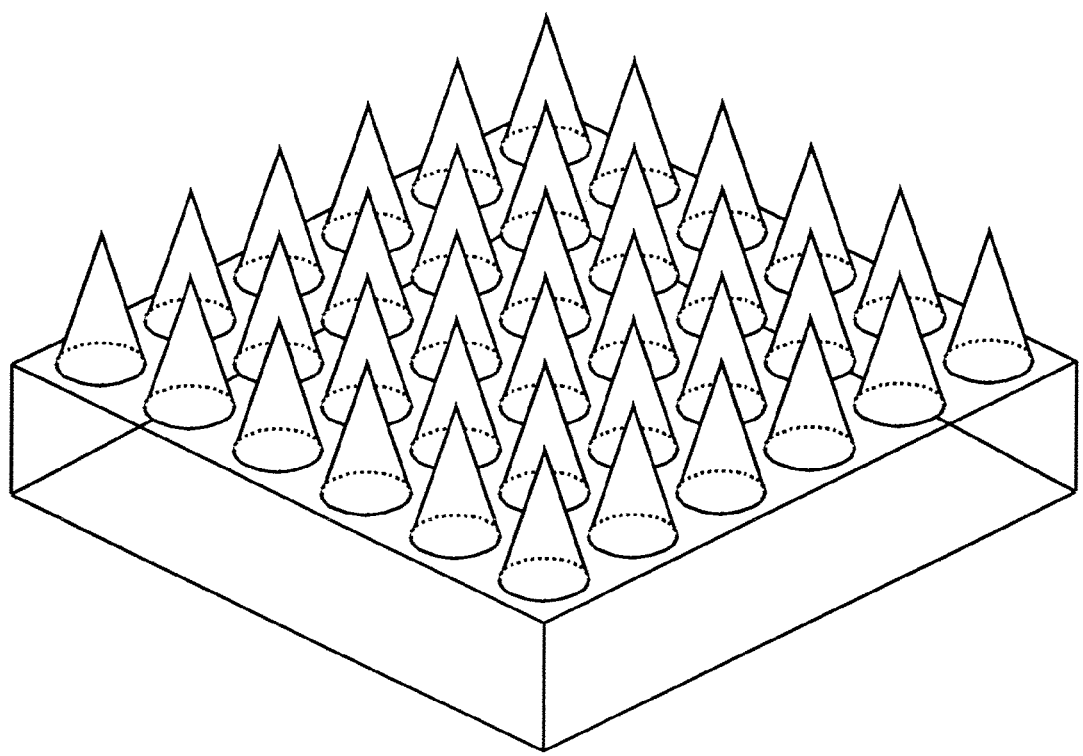
FIG. 12 illustrates a schematic view of a pillar array shaped fine periodic structure.

FIG. 12 illustrates a perspective view of a schematic example of the fine periodic structure as viewed from above, having an anti-reflection effect, on which cones are arranged in a pillar array shape on the substrate. Likewise, a fine periodic structure arranged in a hole array shape can also be formed. Such structure is often fabricated, for example, on a material surface, as a separate means from the anti-reflection film fabricated by laminating a thin film as a single layer or a plurality of layers by means of a vacuum film forming method.

Various methods have been proposed for fabricating such a fine periodic structure, but the present example used an optical nanoimprint method using a UV curable resin.

Figure 13:
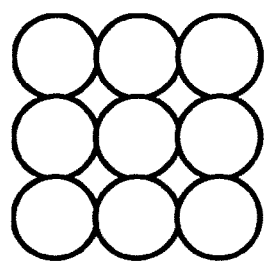
FIG. 13 illustrates an example of an array for the fine periodic structure.
Figure 13:
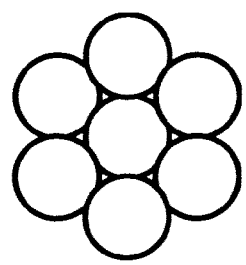

The fine periodic structure was designed to be shaped in a pillar array with periodically arranged cones as illustrated in FIG. 12, considering the applications of the ND filter, having a height of 350 nm and a period 250 nm so as to be a structure enabling reduction in reflectance of at least the visible wavelength region. Further, regarding the matrix-shaped array of protruding structures, there can be considered a square array as illustrated by the plan view of FIG. 13(a) and a three-way (hexagonal) array as illustrated by the plan view of FIG. 13(b). The three-way array is said to have a higher anti-reflection effect because of less exposed surface of the substrate material. Accordingly, the present example used the three-way pillar array.

An appropriate amount of UV curable resin was dropped on a quartz substrate as a mold having a hole array shape obtained by inverting the previously designed shape. Then, the resin was cured by emitting UV light to the substrate subjected to imprinting in a state of pressing the quartz mold thereto, thereby fabricating sub-micron pitch pillar array shaped fine periodic structures 151 and 152 as illustrated in FIG. 3(a). Although various UV curable resins can be used, here PAK-01 (trade name) fabricated by Toyo Gosei Co., Ltd. was used and after polymerization curing, an adjustment was made so as to have a refractive index of 1.50.

Here, in order to increase adhesion between the gradient refractive index thin film and the fine periodic structure, primer treatment was performed to provide an adhesion layer between the gradient refractive index thin film and the fine periodic structure. As a primer solution, surfactant KBM-503 (trade name) fabricated by Shin-Etsu Chemical Co., Ltd., was used as a base, to which an appropriate amount of IPA (isopropyl alcohol) and nitric acid was added, and then an adjustment was made so that the adhesion layer cured after coating had a refractive index of 1.45. The solution was dropped on the gradient refractive index thin film through a 0.2 μm-PTFE (polytetrafluoroethylene) filter, and was coated so as to form an ultra-thin film by spin coating. If there is a need to further strengthen the adhesion, TEOS (tetraethylorthosilicate) may be further added to the component of the aforementioned primer solution. In addition, in order to more uniformly coat the primer solution, before coating the primer solution, hydrophilic processing by UV ozone is more preferably performed on the substrate. Further, in order to coat both surfaces of the substrate, the concentration may be appropriately adjusted and coated by dip coating or after one side thereof may coated by spin coating, then the front and back of the substrate are reversed, and then the other side surface thereof may be coated again by spin coating. In the present example, the latter was selected. The refractive index difference between the adhesion layer and the adjacent structure is preferably within 0.05.

In the case of a filter having absorption over an entire visible wavelength region like the ND filter, the ultraviolet region also often has absorption. Therefore, depending on the wavelength of UV light to be used, when light is emitted from the substrate side of the filter, the ND filter absorbs at least part of the light, and thus sufficient light may not reach the resin. Thus, in that case, there is a need to emit UV light from the mold side and to select a mold having a material allowing the required wavelength of UV light to be sufficiently transmitted.

Further, considering the optical nanoimprint process, nanoimprint lithography, when one side surface of the substrate 13 is subjected to imprinting, and then the other side surface thereof is subjected to imprinting, it is assumed to result in damages such as cracking or chipping in the initially formed fine periodic structure. In light of this, there was selected a method of arranging imprint molds on each surface of the substrate and simultaneously performing optical nanoimprint on both surfaces thereof. In this case, productivity can be increased by arranging two UV light sources for each surface of the substrate.

A 0.1 mm-thick PET film was used for the substrate 13 for forming the ND filter 14 of Example 3 as described above so as to have a refractive index of about 1.60. The present example used a PET film, but without being limited to this, a glass-based material may be used, or PO- or PI-based, PEN-, PES-, PC-, or PMMA-based resin materials may also be used.

Figure 14:
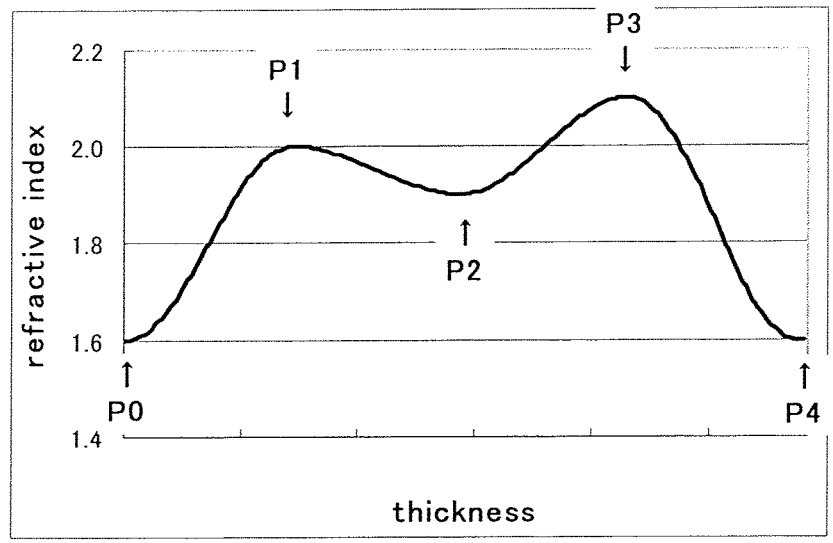
FIG. 14 illustrates refractive index profiles of the gradient refractive index thin film in Example 3. A substrate is located on the left side, and an anti-reflection structure is located on the right side.
Figure 14:
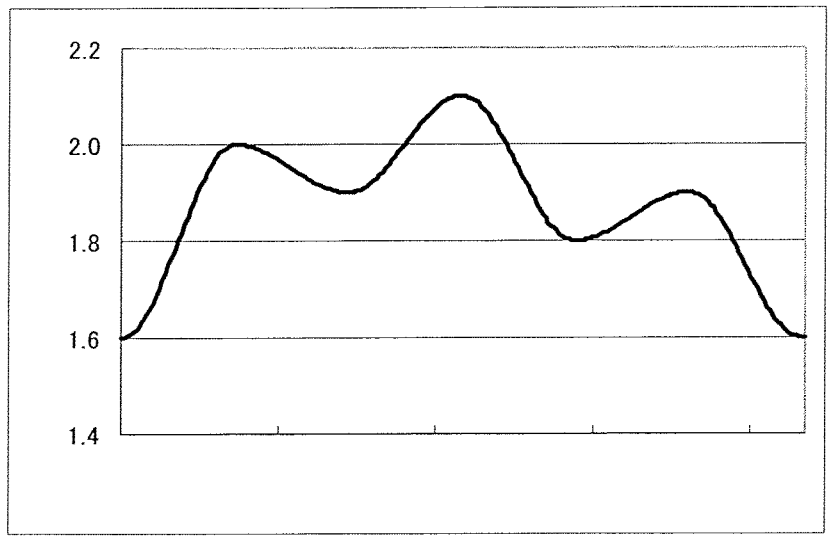

In the refractive index profile of FIG. 14($a$), X of TiOx is fixed to about 1.5 from interface point P0 to point P1 on the substrate side, and a continuous refractive index change was formed by changing the composition ratio with $SiO_2$.

Then, as starting at point P1, passing through point P2, and coming close to point P3, X of TiOx was continuously changed from 1.5 to 1.0. At the same time, the composition ratio with $SiO_2$ was changed; as approaching from point P1 to point P2, the composition ratio of $SiO_2$ with TiOx was increased, and further as approaching from point P2 to point P3, the composition ratio of $SiO_2$ with TiOx was decreased, thereby forming a continuous refractive index change.

Further, X of TiOx was fixed to about 1.0 from point P3 to interface point P4 on the anti-reflection structure side, and a continuous refractive index change was formed by changing the composition ratio with $SiO_2$.

The vicinity of point P1 indicates the spectral transmission significantly affected by $Ti_2O_3$ and the vicinity of point P3 indicates the spectral transmission significantly affected by the TiO. Thus, in such a structure, the regions having different dispersion characteristics as illustrated in FIG. 6 in visible wavelength region are mixed in the gradient refractive index thin film, and desired transmission characteristics can be obtained by adjusting the degree of influence by the film thickness and the composition ratio. In the present example, these were adjusted so that the spectral transmission characteristics were flat-shaped in the visible wavelength region.

As described above, the present example was configured such that the gradient refractive index thin film 12 had a profile of the refractive index as illustrated in FIG. 14($a$). Although a profile illustrated in FIG. 14($b$) having a plurality of peaks and bottoms in FIG. 14($a$) can be formed, considering ease of control, the present profile was designed to be minimum required increase or decrease not to be complicated. A refractive index difference is easy to occur in an interface between the substrate and the anti-reflection structure. From the point of view of anti-reflection, a film design was made so that the refractive index change was gradual in a region near the substrate and the anti-reflection structure. From the point of view of anti-reflection, it is preferable to design so as not to cause a refractive index difference as much as possible as illustrated by the schematic view in FIG. 1. However, in order to obtain a desired absorption, a high refractive index region is required. Thus, the gradient refractive index thin film is preferably such that the refractive index gradually increases from the vicinity of the substrate, passing through the inflection point, and gradually approaches the refractive index of the anti-reflection structure toward the anti-reflection structure.

Meanwhile, if there are different refractive indices not only in an interface between the substrate and the gradient refractive index thin film but also in an interface between the gradient refractive index thin film and the fine periodic structure, reflection occurs according to the refractive index difference. In light of this, if there a problem with reflection in these interfaces, the refractive index difference is preferably minimized as much as possible. In the present example, the rate ratio between $SiO_2$ and TiOx was adjusted immediately after the start of film formation of the gradient refractive index thin film and just before the end of film formation thereof, thereby adjusting each refractive index difference at the two interfaces to be 0.05 or less. In addition, the gradient refractive index thin film 12 was adjusted to have a film thickness of 200 nm. The thinner the film thickness of the gradient refractive index thin film is, the steeper the rate of change in refractive index from the substrate to the anti-reflection structure is. Thus, from the point of view of anti-reflection, a thicker film is preferable. If there is a need to more reduce reflection, the need can be addressed by increasing the thickness up to about 400 nm.

<Optical Filter Characteristics>

Figure 15:
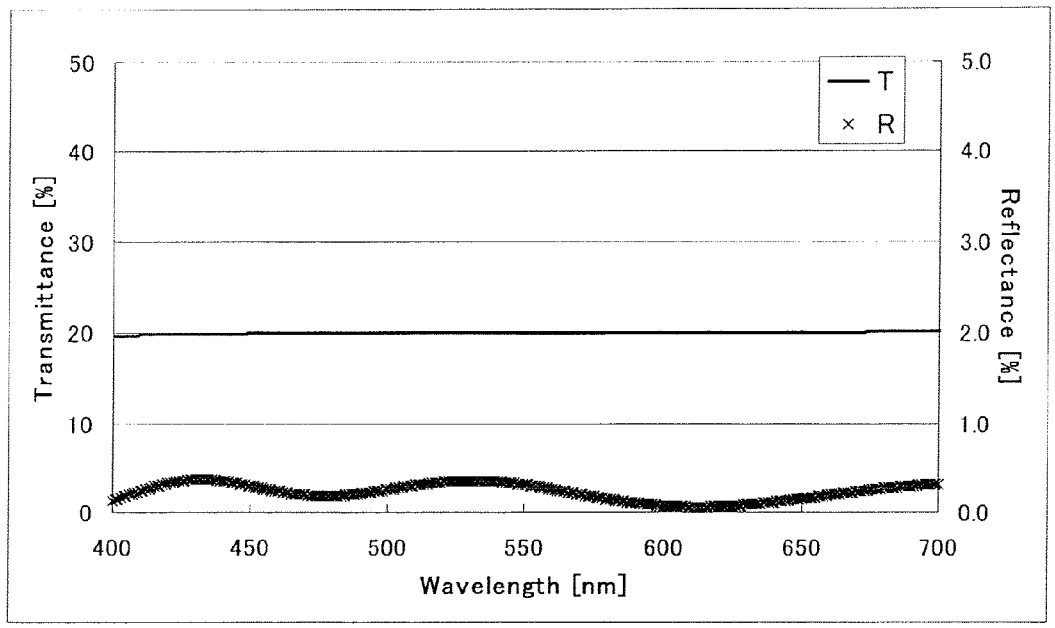
FIG. 15 illustrates spectral reflectance characteristics of the optical filter fabricated in Example 3.

FIG. 15 illustrates the spectral reflectance characteristics and the spectral transmittance characteristics of the ND filter fabricated as described above. The density is about 0.70 and the reflectance in most of the visible wavelength region is 0.4% or less. The present structure achieved a very low reflectance. Spectrophotometer (U4100) fabricated by Hitachi High-Technologies Corporation was used for measurement.

Further, the spectral transmission characteristics are flat in an entire visible region. If flatness is defined as {(maximum value of transmittance at 400 to 700 nm)−(minimum value of transmittance at 400 to 700 nm)}÷(average value of transmittance at 500 to 600 nm), which is one of the indices of flatness, the flatness of the filter fabricated by the present example was about 2.5%. The reflectance of the visible light region was reduced to a very low value of 0.5% or less and the ND filter excellent in flatness was obtained.

A higher density thin film can be stably formed by a sputtering method than by a deposition method or other methods.

In the present example, oxides were used for controlling the refractive index, but nitride may also be used, and various compounds may be used as long as the refractive index changes continuously and periodically as the gradient refractive index thin film.

Adhesion and durability can be improved by providing a buffer layer between the substrate and the gradient refractive index thin film and/or between the gradient refractive index thin film and the anti-reflection structure. In this case, a design considering the buffer layer may be made. The refractive index of the buffer layer is set to be the same as that of the adjacent substrate or the anti-reflection structure, or the refractive index difference is set to be minimized, and the refractive index difference is preferably set to be 0.05 or less. Such a buffer layer can be used as well in a structure having another gradient refractive index thin film as illustrated in FIG. 16.

Examples of the adhesion layer forming materials when the adhesion layer is provided as the buffer layer include not only a silane coupling agent but also inorganic materials such as Cr, Ti, TiOx, TiNx, SiOx, SiNx, AlOx, and SiOxNy and various organic materials. Any adhesion layer forming material can be appropriately selected and used from well-known materials according to the material of the layer for increasing adhesion. The film thickness of the adhesion layer may be set so as to obtain the intended optical function and adhesion of the filter. The adhesion layer may be formed, for example, as a thin film of 10 nm or less.

Example 4

Figure 16:
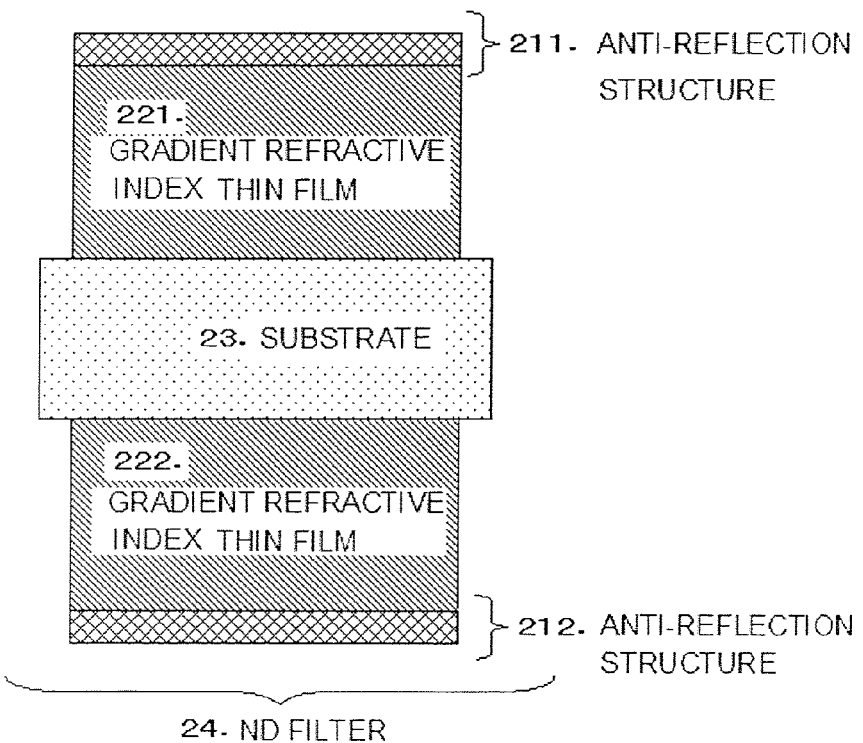
FIG. 16 illustrates a structure example of an optical filter fabricated in Example 4.

There follows a description of fabrication of a filter forming gradient refractive index thin films on each surface of the substrate as illustrated in FIG. 16.

Figure 17:
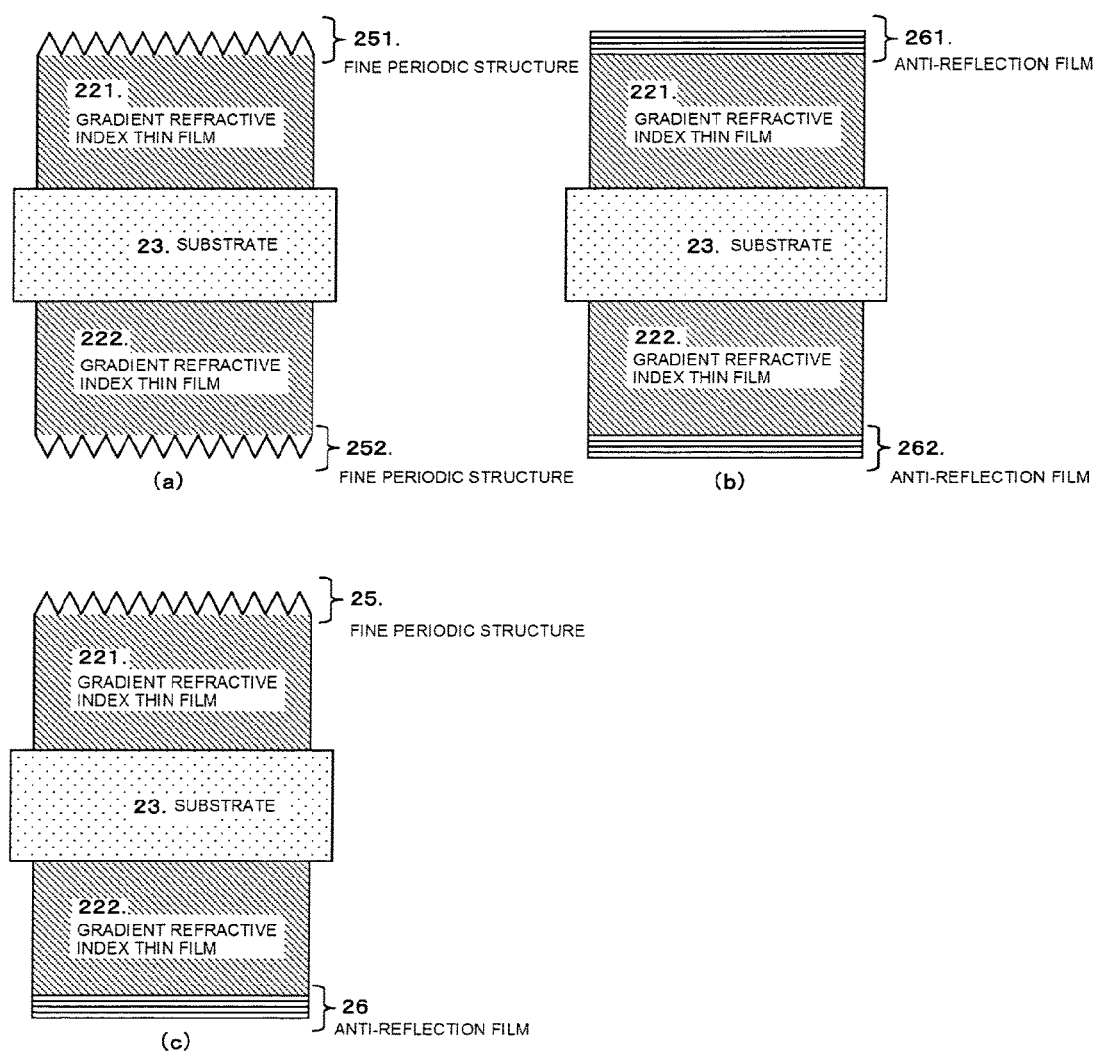
FIG. 17 illustrates a structural example of the optical filter according to Example 4.

As illustrated in FIG. 16, in the present example, a gradient refractive index thin film 221 was arranged on one side surface (upper surface) of a substrate 23, and an anti-reflection structure 211 was arranged on the gradient refractive index thin film 221. Then, likewise, a gradient refractive index thin film 222 (another gradient refractive index thin film) and an anti-reflection structure 212 (another anti-reflection structure) were arranged on a lower side surface of the substrate 23. Both gradient refractive index thin films 221 and 222 provided a function having a desired absorption in a desired wavelength region of the ND filter 24. Under certain circumstances, only one or the other of the gradient refractive index thin films 221 and 222 can provide the similar characteristics. Examples of such anti-reflection structures 211 and 212 can include fine periodic structures 251 and 252 having an anti-reflection effect; and anti-reflection films 261 and 262 formed of a thin film of a single layer or a plurality of layers as illustrated in FIGS. 17(a) and (b). Further, the examples thereof can include a structure of combining a fine periodic structure 25 and an anti-reflection film 26 as illustrated in FIG. 17(c). Any optimal structure may be appropriately selected.

Of FIGS. 17(a) to (c), the structure as illustrated in FIG. 17(a) is more preferable from the point of view of reduction in reflection. Thus, in the present example, as illustrated in FIG. 17(a), the fine periodic structures 251 and 252 were formed on each surface of the substrate 23 as the anti-reflection structure.

SFL-6 glass with a thickness of 1.0 mm was used for the substrate 23 for forming the ND filter 24. In the same manner as in Example 1, first the gradient refractive index thin film 221 was fabricated on one side of the substrate 23 by meta-mode sputtering while adjusting the film formation rate of the $SiO_2$ and TiOx films. In this case, adjustment was also made so as to obtain desired absorbing characteristics by mixing the two kinds of materials and continuously changing the refractive index in the film thickness direction. Thereafter, the front and back of the substrate were reversed, and then the gradient refractive index thin film 222 as a mixed film of $SiO_2$ and TiOx was fabricated again in the same manner. The film thickness of the gradient refractive index thin films 221 and 222 was adjusted to be 200 nm.

Figure 18:
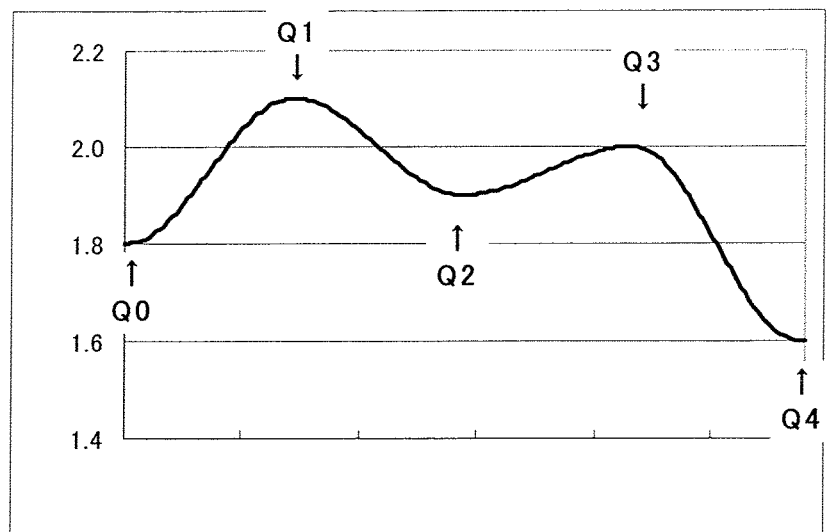
FIG. 18 illustrates refractive index profiles of the gradient refractive index thin film according to Example 4. A substrate is located on the left side, and an anti-reflection structure is located on the right side.
Figure 18:
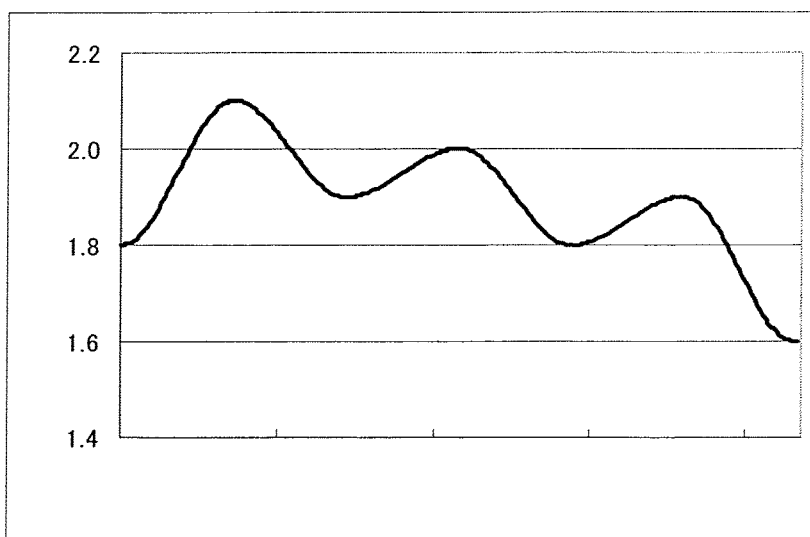

A film design was made such that the absorbing characteristics of the gradient refractive index thin films 221 and 222 were adjusted by not only continuously changing the refractive index in the film thickness direction but also changing X of TiOx in the film thickness direction and changing the extinction coefficients as well so that the spectral transmission characteristics in a visible wavelength region of 400 nm to 700 nm were set to be flat characteristics with small dispersion as a whole film. Specifically, the gradient refractive index thin films 221 and 222 were configured to have a profile of the refractive index as illustrated in FIG. 18(a). Although a profile illustrated in FIG. 18(b) having a plurality of peaks and bottoms in FIG. 12(a) can be formed, considering ease of control, the present profile was designed to be minimum required increase or decrease not to be complicated.

In the refractive index profile of FIG. 18(a), X of TiOx is fixed to about 1.0 from interface point Q0 to point Q1 on the substrate side, and a continuous refractive index change was formed by changing the composition ratio with $SiO_2$.

Then, as starting at point Q1, passing through point Q2, and coming close to point Q3, X of TiOx was continuously changed from 1.0 to 1.5. At the same time, the composition ratio with $SiO_2$ was changed; as approaching from point Q1 to point Q2, the composition ratio of $SiO_2$ with TiOx was increased; and further as approaching from point Q2 to point Q3, the composition ratio of $SiO_2$ with TiOx was decreased, thereby forming a continuous refractive index change.

Further, X of TiOx was fixed to about 1.5 from point Q3 to interface point Q4 on the anti-reflection structure side, and a continuous refractive index change was formed by changing the composition ratio with $SiO_2$.

The vicinity of point Q1 indicates the spectral transmission significantly affected by TiO and the vicinity of point Q3 indicates the spectral transmission significantly affected by the $Ti_2O_3$. Thus, in such a structure, the regions having different dispersion characteristics as illustrated in FIG. 6 in visible wavelength region were mixed in the gradient refractive index thin film, and desired transmission characteristics can be obtained by adjusting the degree of influence by the film thickness and the composition ratio. In the present example, these were adjusted so that the spectral transmission characteristics were flat-shaped in the visible wavelength region.

Thus, from the point of view of maintaining the absorbing characteristics and performing anti-reflection, the gradient refractive index thin film is preferably such that the refractive index gradually increases from the vicinity of the substrate, passing through the inflection point, and gradually approaches the refractive index of the anti-reflection structure toward the anti-reflection structure. In addition, even in the gradient refractive index thin film, the less the refractive index change is, the better it is. In the present example, the refractive index difference between the substrate 23 and the anti-reflection structures (fine periodic structures 251 and 252) was large, and thus an inflection point having the largest refractive index of a plurality of inflection points was set on the side nearest to the substrate.

Thereafter, the sub-micron pitch fine periodic structures 251 and 252 having anti-reflection effects were formed on the gradient refractive index thin films formed on both surfaces of the substrate by optical nanoimprint method using a UV curable resin. For the same reason as in Example 1, in the present example, imprint molds were arranged on each surface of the substrate and optical nanoimprint was simultaneously performed on both surfaces of the substrate on which the ND film was formed. In the same manner as in Example 3, primer treatment was performed between the gradient refractive index thin film and the fine periodic structure corresponding to the gradient refractive index thin film, thereby providing the adhesion layer.

Figure 19:
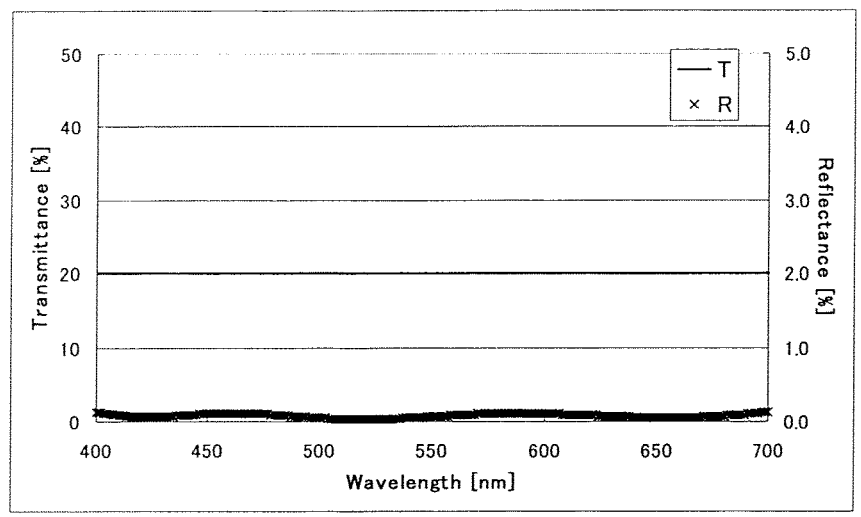
FIG. 19 illustrates spectral reflectance characteristics of the optical filter fabricated in Example 4.

The spectral reflectance characteristics of the ND filter and the spectral transmittance characteristics fabricated as described above were illustrated in FIG. 19. The density was about 0.70 and the reflectance in the visible wavelength region was about 0.2% or less. The present structure achieved a very low reflectance. A spectrophotometer was used for measurement.

Further, spectral transmission characteristics were flat over the entire visible region, and in terms of above-described flatness index, flatness of the filter fabricated by the present example was about 0.5%, the reflectance of the visible light region was reduced to a very low value of 0.5% or less, and the filter excellent in flatness was obtained.

In Examples 1 to 4, a mixed film between $SiO_2$ and TiOx was fabricated by meta-mode sputtering, and a gradient thin film having a continuous refractive index was formed by changing the mixing ratio in the film thickness direction. Without being limited to this, various metal or metalloid oxide materials such as NbOx, TaOx, ZrOx, AlOx, MoSiOx, MoOx, and WOx can be used. From the relation to the refractive index of the structure forming the interface with the aforementioned gradient refractive index thin film, considering the constraints on the process, any optimal material may be appropriately selected as long as the material can achieve the required refractive index. Materials including three or more kinds of metal or metalloid elements may be combined. The refractive index can be stably tilted by combining three or more kinds of materials, which facilitates adjustment of extinction coefficients such as reduction in absorption, thereby increasing freedom of design. At this time, not only oxide but also nitride can increase freedom of design as well.

Further, when reactive deposition is used, the gradient thin film can be formed by controlling the introduced gas and controlling the refractive index and the extinction coefficient. The structure may be such that part of the gradient thin film in the film thickness direction has absorption, or the refractive index is continuously changed while having absorption on the whole. The film forming method is not limited to only the meta-mode sputtering method, but other sputtering methods and various deposition methods may be used.

The gradient refractive index thin film formed according to the present example becomes a high density film and may cause a problem with film stress. In this case, like the present example, the use of a substrate such as glass with high rigidity can reduce problems such as warping due to film stress. Alternatively, the use of gradient refractive index thin films on each surface of the substrate can cancel film stress with each other, thereby producing stable optical filters.

In particular, the structure of providing the gradient refractive index thin film and the fine periodic structure on both surfaces of the substrate used in the present example can provide stability of the substrate to the film stress. In addition, both surfaces of the fine periodic structure can be subjected to optical nanoimprint to form the anti-reflection structure by a series of continuous or simultaneous process, which is excellent in productivity.

Example 5

Figure 20:
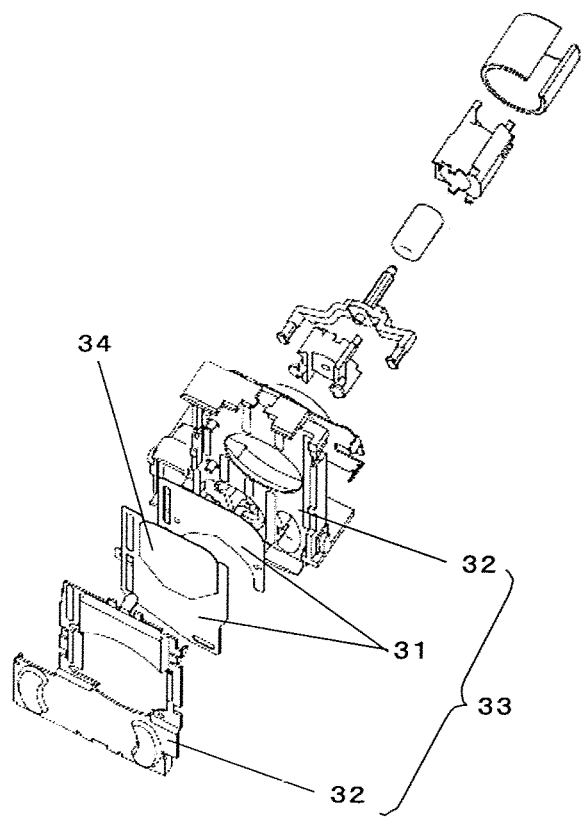
FIG. 20 illustrates an explanatory drawing of a light diaphragm device using an ND filter in Example 5.

FIG. 20 illustrates a light diaphragm device. The aperture of the light diaphragm device suitable for use in an imaging optical system such as a video camera or a digital still camera is provided to control the amount of light incident on a solid-state imaging element such as a CCD or CMOS sensor. The light diaphragm device is structured so as to be narrowed to be smaller by controlling diaphragm blades 31 as the object field becomes brighter. At this time, as a countermeasure to degradation of image quality which occurs in a state of small aperture state, an ND filter 34 is arranged near the aperture, thereby allowing the aperture of the diaphragm to be larger even if the brightness of the object field is the same. Incident light passes through the light diaphragm device 33, and reaches the solid-state imaging element (unillustrated), in which the light is converted into an electrical signal to form an image.

The ND filter fabricated in Examples 1 to 4 is arranged, for example, in a position of an ND filter 34 inside the diaphragm device 33. However, arrangement location is not limited to this, but the ND filter can be arranged so as to be fixed to a diaphragm blade supporting plate 32.

Figure 21:
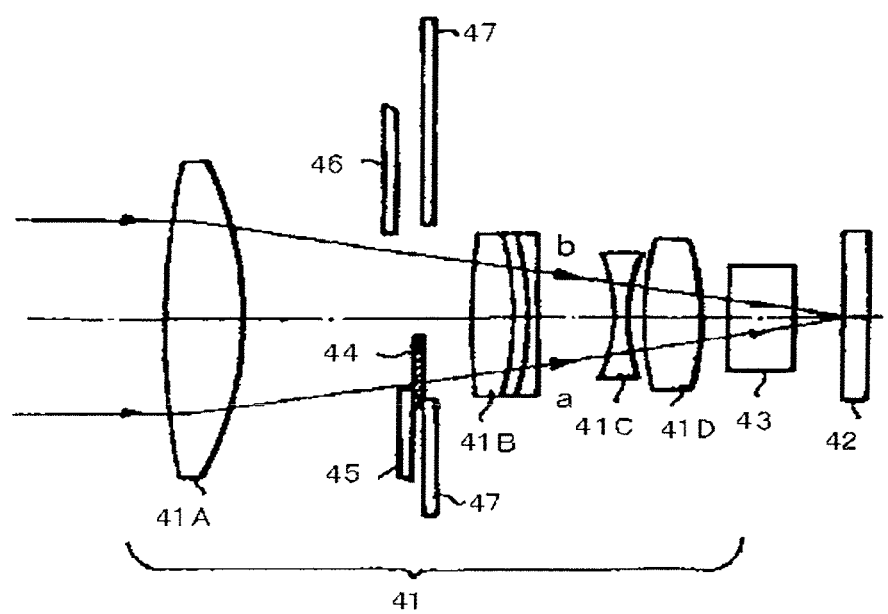
FIG. 21 illustrates an explanatory drawing of an optical system of an optical imaging device using the ND filter in Example 5.

FIG. 21 illustrates a structure of the imaging optical system of the optical imaging device. The imaging optical system 41 includes lens units 41A to 41D, a solid-state imaging element 42 such as a CCD, and an optical low-pass filter 43. The solid-state imaging element 42 receives images of light beams a and b formed by the imaging optical system 41 and converts the images into electrical signals. The imaging optical system 41 includes an ND filter 44, diaphragm blades 45 and 46, and a light diaphragm device including diaphragm blade supporting plates 47.

The aperture of the light diaphragm device suitable for use in the imaging system such as a video camera or a digital still camera is provided to control the amount of light incident on a solid-state imaging element such as a CCD or CMOS sensor. The light diaphragm device is structured so as to be narrowed to be smaller by controlling diaphragm blades 45 and 46 as the object field becomes brighter. At this time, as a countermeasure to degradation of image quality which occurs in a state of small aperture state, an ND filter 44 is arranged near the aperture, thereby allowing the aperture of the diaphragm to be larger even if the brightness of the object field is the same.

Incident light passes through the light diaphragm device, and reaches the solid-state imaging element, in which the light is converted into an electrical signal to form an image. The ND filter fabricated in Examples 1 to 4 is arranged, for example, in a position of an ND filter 44 inside the diaphragm device. However, arrangement location is not limited to this, but the ND filter can be arranged so as to be fixed to a diaphragm blade supporting plate 47.

The structure of the above described examples can provide an imaging apparatus installing an ND filter capable of reducing the possibility of a temporal change of the captured image. The ND filter having a gradient refractive index thin film fabricated in Example 1 to 4 was used as the ND filter 44, and an image that was captured after assembly was compared with the image when one month had elapsed since assembly. As a result of comparison, no difference in color balance was recognized.

Meanwhile, an ND filter 23 in a structure of an optical multi-layer film fabricated by Comparative Example 1 in FIG. 9 was installed as an ND filter 44 and an evaluation was made on an image captured by an optical apparatus using the ND filter 44. As a result, when an image captured immediately after the optical apparatus was assembled was compared with the image of the same object captured after one month had elapsed since assembly, a difference in color balance was recognized.

The ND filter of the present invention has increased environmental stability, and thus can maintain the quality of the captured image by using the ND filter in an optical imaging device such as a camera and a video camera subjected to considerable environmental change when carried around and used.

The light diaphragm device 33 fabricated in the above-described manner can remarkably reduce problems such as ghost caused by filter reflection and can also simultaneously achieve an increase in, for example, color balance due to transmission characteristics.

Without being limited to this, even the other optical apparatuses using the optical filter with reduced reflectance as fabricated by Examples 1 to 4 can reduce problems with the apparatus caused by filter reflection and can also simultaneously reduce problems caused by transmission.

In particular, the imaging optical system having the fine periodic structure and the gradient refractive index thin film described in Example 4 on both sides can suppress reflection to a CCD to obtain a good captured image and can be assembled without considering the direction of installing the ND filter, being excellent in assembly.

Example 6

Figure 22:
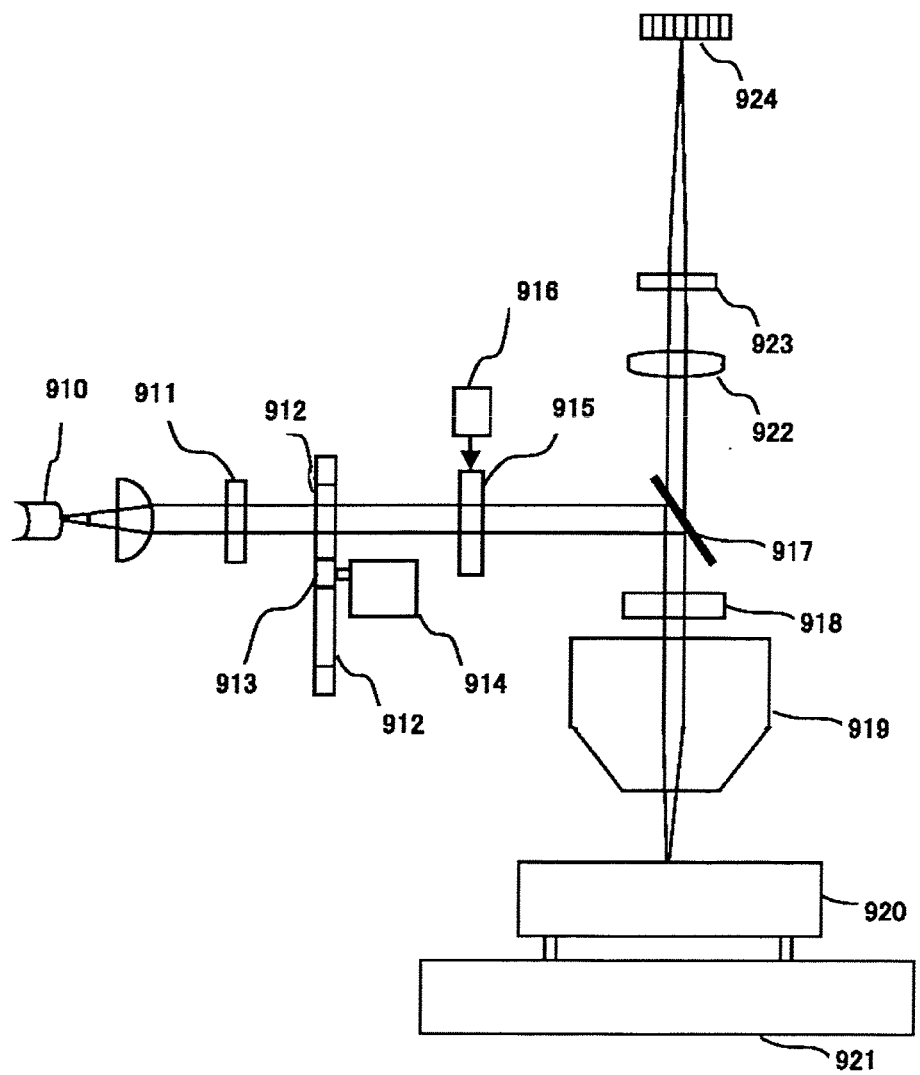
FIG. 22 illustrates an explanatory drawing of an optical measuring device using an ND filter in Example 6.

FIG. 22 illustrates the function and the structure of an interference microscope as an optical measuring device. A light source 910 outputs a predetermined wavelength as the light source. Only a certain wavelength component is extracted from observation light outputted from the light source 910 through a filter 911. Then, the amount of observation light is appropriately adjusted according to the rotational position of a filter holder 913 holding ND filters 912 each having a different transmittance through the ND filter 912 selectively arranged on the optical path. As the light source, a monochromatic wavelength laser light source can be used as the light source.

The filter holder 913 includes a plurality of ND filters 912 each having a different transmittance and selectively arranges, on the optical path, any one of the ND filters 912 having a different transmittance by rotational driving of a rotary driver 914 operating under control of the unillustrated CPU. If the spot diameter of the light source corresponds to the range of gradation, the transmittance may be changed by positioning the gradation ND filter. In this case, the structure may also be made so that the ND filter operates like the diaphragm device illustrated in Example 5. The polarization angle of light through the ND filter 912 is changed through a polarizing plate 915 arranged on the optical path as well. The polarizing plate 915 is rotatably driven by a polarizing plate rotary driver 916 to change the polarization angle of transmitting light into a desired angle. The polarizing plate rotary driver 916 also operates under control of the CPU.

The light passing through the polarizing plate 915 is reflected in a sample direction by a half mirror 917, and then is divided into two parallel optical paths in the polarization direction by a prism 918. The light beams divided into two optical paths are emitted together to an observation object 920 placed on a focus observation mechanism 921 for adjusting focus through an object lens 919.

The light reflected from the observation object 920 passes through the object lens 919 and the prism 918, and this time transmits through the half mirror 917. Then, the light is focused on an imaging element 924 such as a CCD by an imaging lens 922. An analyzer 923 as a rotatable polarizing element is interposed between the imaging lens 922 and the imaging element 924 on the optical path.

The output of the imaging element 924 is converted into digital signals, which are subjected to processing by the CPU. The surface structure, the refractive index distribution can be analyzed by analyzing the observed interference fringe. The optical measuring device is not limited to the present example, but the use of the ND filter of the present invention allows measurements with reduced adverse effects due to temporal change of the ND filter in the optical measuring device that is an optical apparatus requiring the reliability of measurement accuracy over a long period of time. As a result, it is possible to improve the image quality stability such as an interference fringe which is an image captured by an optical apparatus such as an optical measuring device concerned with adverse effects on the measurement results for a long-term use.

Other Examples

Optical filters other than the ND filter described in Examples 1 to 4 can also be expected to have similar effects and can be applied to a color filter as long as they are optical filters having absorption and addressing the flatness of the transmitted light. These optical filters applied to the present invention can reduce the reflectance and obtain desired transmission characteristics. In addition, various optical apparatuses including these optical filters can improve the above described problems.

REFERENCE SIGNS LIST 111, 112, 211, 212 anti-reflection structure
12, 221, 222 gradient refractive index thin film
3, 13, 23, 51 substrate
15, 151, 152, 251, 252 fine periodic structure
16, 161, 162 anti-reflection film
31 diaphragm blade
32 diaphragm blade supporting plate
33 light diaphragm device
4, 14, 24, 34, 44, 912 ND filter
41 imaging optical system
41A, 41B, 41C, 41D lens unit
42 solid-state imaging element
43 optical low-pass filter
45, 46 diaphragm blade
52 substrate transfer apparatus
53 vacuum chamber
54,55 sputter region
54a, 55a target
56 high-frequency power source
57 reaction region

The invention claimed is:

1. An optical filter comprising:
  a light-transmitting substrate; and
  a light-absorbing gradient refractive index thin film consisting of a thin film having no interface in the whole inner part thereof, and wherein the refractive index and an extinction coefficient continuously change by a change in film composition so that the refractive index is close to the refractive index of the substrate toward the substrate side in a film thickness direction thereof,
  wherein the light-absorbing gradient refractive index thin film, in the film thickness direction, comprises:
  (1) a first region where a spectral transmission characteristic of a visible wavelength region increases approaching a long wavelength side based on the changes of the refractive index and the extinction coefficient; and
  (2) a second region, which is located in a region different from the first region in the film thickness, and where the spectral transmission characteristic of the visible wavelength region decreases approaching the long wavelength side based on the changes of the refractive index and the extinction coefficient, and wherein the changes of the refractive index and the extinction coefficient per film thickness of the light-absorbing gradient refractive index thin film decrease approaching the interface of the light-absorbing gradient refractive index thin film on the side of the substrate so that the refractive index of the light-absorbing gradient refractive index thin film is close to the refractive index of the substrate.

2. The optical filter according to claim 1, wherein a composition of a material constituting the light-absorbing gradient refractive index thin film continuously changes in the film thickness direction.

3. The optical filter according to claim 1, further comprising an anti-reflection structure on a surface on a side opposite to the substrate side of the light-absorbing gradient refractive index thin film, wherein the light-absorbing gradient refractive index thin film changes a refractive index in the film thickness direction so as to reduce a refractive index difference between the refractive index of the substrate and the refractive index of the anti-reflection structure.

4. The optical filter according to claim 3, wherein the anti-reflection structure is a fine structure having a pitch shorter than a wavelength of visible light.

5. The optical filter according to claim 4, wherein the fine structure has a periodic structure having a pitch shorter than a wavelength of visible light.

6. The optical filter according to claim 3, comprising another anti-reflection structure on a surface on a side opposite to the anti-reflection structure side of the substrate.

7. The optical filter according to claim 6, further comprising another gradient refractive index thin film whose refractive index changes in the film thickness direction between the substrate and the another anti-reflection structure so as to reduce the refractive index difference between the refractive index of the another anti-reflection structure and the refractive index of the substrate.

8. The optical filter according to claim 7, wherein the another anti-reflection structure is an anti-reflection film of a single layer or a plurality of layers, and wherein the another gradient refractive index thin film changes the refractive index in the film thickness direction so as to reduce the refractive index difference between the refractive index of a layer adjacent to the another gradient refractive index thin film of the anti-reflection film and the refractive index of the substrate.

9. The optical filter according to claim 7, wherein the another anti-reflection structure is a fine structure having a pitch shorter than a wavelength of visible light.

10. The optical filter according to claim 9, wherein the fine structure has a periodic structure having a pitch shorter than a wavelength of visible light.

11. The optical filter according to claim 1, wherein the light-absorbing gradient refractive index thin film is composed of three or more elements.

12. The optical filter according to claim 1, wherein the refractive index difference between an end point of the refractive index change on the substrate side of the light-absorbing gradient refractive index thin film and the substrate is less than 0.05.

13. An optical apparatus comprising the optical filter according to claim 1 in an imaging optical system.

14. The optical filter according to claim 1, wherein the light-absorbing gradient refractive index thin film has a refractive index change comprising at least one inflection point at which the refractive index and the extinction coefficient decrease after the refractive index and the extinction coefficient increase in the film thickness direction of the light-absorbing gradient refractive index thin film.

15. An optical filter comprising:
a light-transmitting substrate; and
a light-absorbing gradient refractive index thin film consisting of a thin film having no interface in the whole inner part thereof, and wherein a refractive index and an extinction coefficient continuously change so that the refractive index is close to the refractive index of the substrate toward the substrate side in a film thickness direction thereof, wherein the light-absorbing gradient refractive index thin film, in the film thickness direction, comprises:

(1) a first region where a spectral transmission characteristic of a visible wavelength region increases approaching a long wavelength side based on the changes of the refractive index and the extinction coefficient; and (2) a second region, which is located in a region different from the first region in the film thickness, and where the spectral transmission characteristic of the visible wavelength region decreases approaching the long wavelength side based on the changes of the refractive index and the extinction coefficient, and wherein the changes of the refractive index and the extinction coefficient per film thickness of the light-absorbing gradient refractive index think film decrease approaching the interface of the light-absorbing gradient refractive index thin film on the side of the substrate so that the refractive index of the light-absorbing gradient refractive index thin film is close to the refractive index of the substrate.

* * * * *